US007162450B2

(12) United States Patent
Ponzio, Jr.

(10) Patent No.: US 7,162,450 B2
(45) Date of Patent: Jan. 9, 2007

(54) BUSINESS METHOD FOR DETERMINING QUALITY AND INTEGRITY OF DATA CONTENT

(76) Inventor: Frank J. Ponzio, Jr., 216 Buccaneer Way, Mantoloking, NJ (US) 08738

( * ) Notice: Subject to any disclaimer, the term of this patent is extended or adjusted under 35 U.S.C. 154(b) by 722 days.

(21) Appl. No.: 09/894,180

(22) Filed: Jun. 28, 2001

(65) Prior Publication Data

US 2002/0016717 A1 Feb. 7, 2002

Related U.S. Application Data

(60) Provisional application No. 60/233,691, filed on Sep. 19, 2000, provisional application No. 60/215,552, filed on Jun. 30, 2000.

(51) Int. Cl.
*H04I 9/00* (2006.01)
(52) U.S. Cl. .................. 705/51; 380/203; 380/204
(58) Field of Classification Search ............ 382/141, 382/149; 348/92; 705/1, 57, 58, 50, 51; 380/203, 204
See application file for complete search history.

(56) References Cited

U.S. PATENT DOCUMENTS

| | | | | |
|---|---|---|---|---|
| 4,527,239 | A | * | 7/1985 | Brandin ............... 711/216 |
| 5,410,344 | A | * | 4/1995 | Graves et al. .......... 725/46 |
| 5,737,734 | A | | 4/1998 | Schultz |
| 5,820,386 | A | | 10/1998 | Sheppard |
| 5,855,015 | A | | 12/1998 | Shoham |
| 5,892,898 | A | | 4/1999 | Fujii et al. |
| 6,012,053 | A | | 1/2000 | Pant et al. |
| 6,029,195 | A | | 2/2000 | Herz |
| 6,076,082 | A | | 6/2000 | Kindo |
| 6,253,213 | B1 | | 6/2001 | Vanderschaaf |
| 6,275,986 | B1 | | 8/2001 | Ewart |
| 6,628,817 | B1 | * | 9/2003 | Ishikawa et al. ......... 382/141 |

FOREIGN PATENT DOCUMENTS

JP 2001350677 * 12/2001

OTHER PUBLICATIONS

Wattterson, Karen, Attention, Data-Mart Shoppers, BYTE Magazine, Jul. 1997, McGraw-Hill Companies, USA.
White, Colin, Managing Data Transformations, BYTE Magazine, Dec. 1997, McGraw-Hill Companies, USA.
Grehan, Rick, Redesigned Delphi Masters Networked Apps, BYTE Magazine, May, 1997, McGraw-Hill Companies, U.S.A.
Hackathorn, Richard, Data Warehousing's Credibility Crisis, BYTE Magazine, Aug. 1997, McGraw-Hill Companies, U.S.A.
Nicholls, Bill, Building Software In An Organized Fashion IV, BYTE Magazine, Aug. 1999, McGraw-Hill Companies, U.S.A.
Bhateja, Rajiv, and Katz, Randy H., Valkyrie: A Validation Subsystem of a Version Server for Computer-Aided Design Data, 1987, pp. 321-327, Association of Computing Machinery, U.S.A.

(Continued)

*Primary Examiner*—Elisca Pierre Eddy
(74) *Attorney, Agent, or Firm*—Mathews, Shepherd, McKay & Bruneau, P.A.

(57) ABSTRACT

A method and system for communicating data inspecting, monitoring and analysis information by signaling between digital devices is described. A process analyzes the data, which is then subjected to a variety of inspection and validation methods and systems. The results created by the process are then used to signal a grade and rating of the data to specified recipients. Additionally, selected reporting and notification are also sent to specified recipients. Dynamic control of the process is provided if specific information is also received for the information to be processed.

24 Claims, 22 Drawing Sheets

OTHER PUBLICATIONS

Cook, Janet M., Teaching Integrity Features: Using Data Verification to Illustrate the Use of Subprocedures in Elementary Programming Classes, 1985, 9 pages, Association of Computing Machinery, U.S.A.

Software Engineering Institute Capability Maturity Model Issue Paper, Sep. 1996.

How to Buy Information: The A-B-C's of Data Purchasing, Acxiom Corporation, U.S.A.

Wen, Wu and Callahan, John, Verification and Validation of KBS With Neural Network Components, Nasa/WVU Software Research Laboratory, 5 pgs., Morgantown, WV, U.S.A.

* cited by examiner

BUSINESS METHOD FOR DETERMINING QUALITY AND INTEGRITY OF DATA CONTENT

CROSS REFERENCES TO RELATED APPLICATIONS

This application claims the benefit of U.S. Provisional Patent Application Ser. No. 60/215,552 filed on Jun. 30, 2000 and the benefit of U.S. Provisional Patent Application Ser. No. 60/233,691 filed on Sep. 19, 2000.

FIELD OF THE INVENTION

This invention relates to a business method and more particularly to the management of data.

BACKGROUND OF THE INVENTION

A growing complexity and interdependence of discrete computer systems requires reliance on data, the quality of which a particular user system has little or no control over. While the phrase "garbage in is garbage out" has been used for over half a century to describe data quality, until recently computer systems functioned independently, in isolated environments or over isolated networks. The garbage data typically impacted only the immediate system, which essentially was under control of the user.

The advent of network based computer business applications, electronic data interchange and an increasing reliance on digital databases requires control over data quality and integrity. Essentially it is the flow of data between the various computer systems that drives their very functionality. The interconnection of discrete computer systems through standardized networks, such as the Internet, has enabled data to be immediately accessible by other systems, where there is typically no control over the data quality and/or integrity. There is a need for knowledge about the quality and integrity of the data flowing between systems and within a system.

Current systems are concerned with the integrity and quality of data between two points, assuming that the data is error free at the first point and may become corrupted when it reaches the second point. Various schemes of error detection and correction are well known. More recently, digital signatures have been used to protect data integrity and identify its origination (source).

Most schemes for controlling data quality at its origination are generally directed towards program errors and bugs, by testing the program using test case sites. These schemes are very dependent upon the user interface, the programming languages, the database system, the operating system, and the system environment. These schemes are testing schemes, attempting to approximate a real user environment, but mostly occur in a laboratory environment. These schemes are discontinued once the software is released although they may start again when a new release is being prepared.

There is a need to be able to provide controlled inspection, monitoring and analysis of data to provide knowledge about its quality and integrity as the data is shipped between various computer systems and computer networks.

SUMMARY OF THE INVENTION

The present invention is a business method for determining quality of content of data for a receiver of the data. The business method comprising the following steps: assessing the content of the data using criteria corresponding to a business; assigning a grade as a function of the criteria, the grade indicative of the quality of the content of the data; and, linking the grade to the content of the data; wherein the receiver dynamically accesses the grade to determine subsequent use of the data without having to access the data.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention, method and system for communicating data inspecting, monitoring and analysis information, is particularly well suited for use with the Internet and shall be so described, the present invention is equally well suited for use in other network communication systems including but not limited to an Intranet, extranet, Interactive television (iTV) and similar interactive networked communication systems.

Although the present invention, method and system for communicating data inspecting, monitoring and analysis information, is particularly well suited for implementation as an independent software systems and shall be so described, the present invention is equally well suited for implementation as a functional/library module, an applet, a plug in software application, as a device plug in, and in a microchip implementation.

Figure 1:
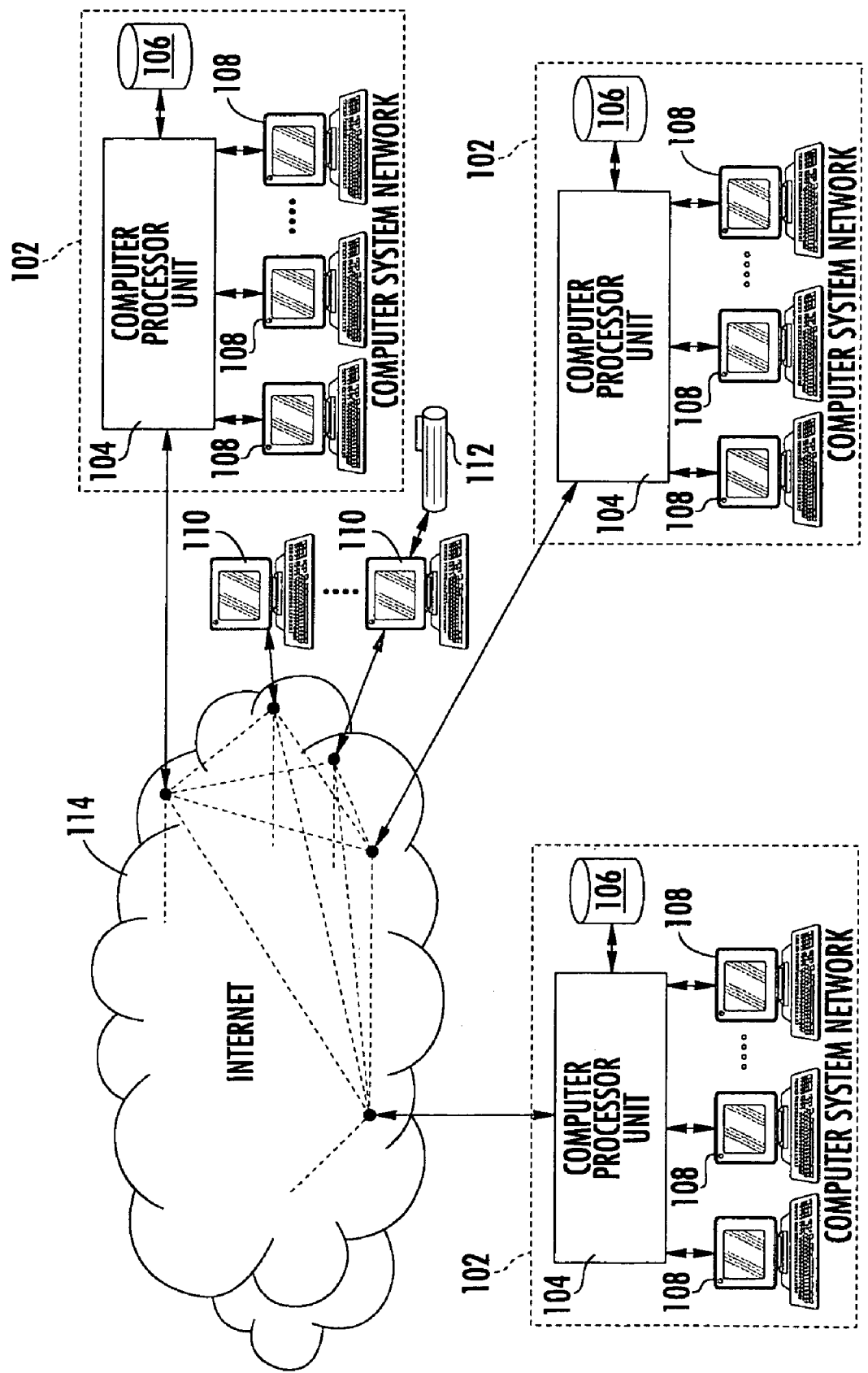
FIG. 1 is a stylized overview of interconnected computer system networks.

Referring to FIG. 1 there is shown a stylized overview of interconnected computer system networks. Each computer system network 102 contains a corresponding local computer processor unit 104, which are coupled to a corresponding local data storage unit 106, and local network users 108. The local computer processor units 104 are selectively coupled to a plurality of users 110 through the Internet 114. Each of the plurality of users 110 may have various devices connected to their local computer systems such as scanners, bar code readers, RFID detectors and other interface devices 112. A user 110 locates and selects (such as by clicking with a mouse) a particular Web page, the content of which is located on the local data storage unit 106 of the computer system network 102, to access the content of the Web page. The Web page may contain links to other computer systems and other Web pages.

Where implemented as a separate software application, the system can be run on a server as a service application such as an Internet subscription service as well as traditional software application. The system can be implemented as a software module used by an application, a library routine called by an application, or a software plug in called by a browser or similar application. The system is ideally suited for implementation as a hand held digital device, such as a personal digital assistant or dedicated system, where it can act as a physical data barrier or wall, enabling the digital device to be simply plugged into existing legacy system or offered as an optional upgradeable hardware feature or a temporary device. The system can be implemented as an embedded device, such as an application specific integrated circuit (ASIC), an integrated circuit chip set, for use on a motherboard, application board, or within a larger integrated circuit.

The system provides for inspecting, validating, grading, and reporting on information providing the user remote control of the process. Information is directed to the process using a variety of existing and future transportation methods. The process analyzes the information received to isolate the data parts to be processed. These data parts are then subjected to a variety of inspection and validation methods and systems. The results are then used to create a grade and rating of the information, which along with the results are forwarded to specified recipients. A selected reporting and notification are also sent to specified recipients. Dynamic control of the process is provided if specific information is also received for the information to be processed. The present system of data validation and monitoring is a solution for the plaguing garbage in-garbage out problem that all computer systems must deal with. The garbage in can be a result of human errors, software errors, and any system or network component errors that stores or moves the data. Garbage out can result if the user does not detect the garbage in or if the user adds to the garbage in. Once the flow of garbage data has begun from system to system, its subsequent cleanup is a costly, labor-intensive process.

The present invention can be used to block garbage from leaving a computer or digital device as well as used to block garbage from entering a computer or digital device, essentially functioning as a data "fire wall." The data wall can be a physical barrier to transfer of data as well as a logical barrier, which enables other action to be taken with the data that is allowed to transfer.

Figure 2:
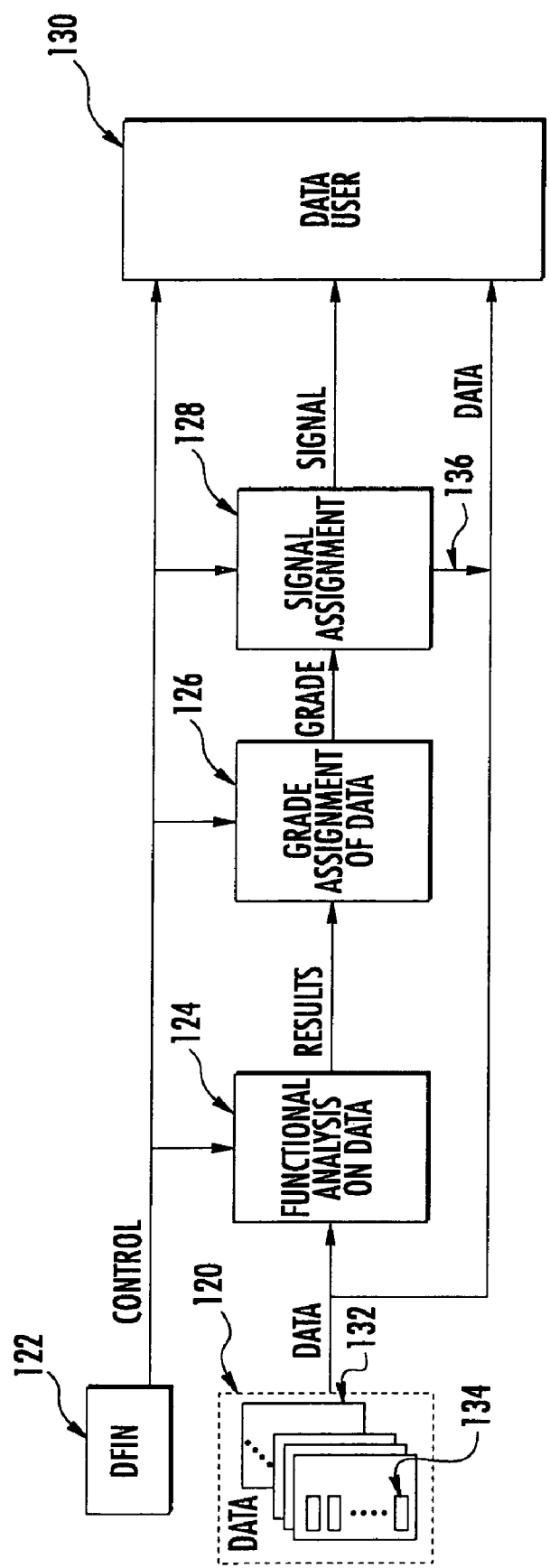
FIG. 2 is a block diagram of the method and system for communicating data inspecting, monitoring and analysis information.

Referring to FIG. 2 there is a block diagram of the present invention, method and system for communicating data inspecting, monitoring and analysis information. Data 120 is comprised of a plurality of data records 132 which contain a plurality of data fields 134. The data 120 is provided to the data user 130 and a functional analysis means 124. The results of the functional analysis means 124 is provided to the grade and rating assignment 126. The results of the grade assignment is provided to the signal assignment 128. A DFIN 122 is used to control and select features and options within the functional analysis means 124, the grade assignment 126 and the signal assignment 128. The DFIN 122 is also provided to the data user 130. Data 120, the DFIN 122 and data user 130 may be independent of each other. The functional analysis means 124 can be a rule based system, a look up based system, or an external system comprised of rules and lookup. The DFIN 122 is used to override the pre-stored selections that are stored in the customer registry. As an example the Functional Analysis of Data 124 the DFIN could be used to select a finer grain of analysis. For the Grade Assigned of Data 126 the DFIN as an example could be used to select another grade and rating scheme. For the Signal Assignment 128 the DFIN as an example could be used to deselect the field level signal generation. The DFIN would be forwarded to the Data User 130 for informational purposes regarding the results.

The Grade Assignment 126 uses the results of Functional Analysis of Data 124. For this example referred to in Tables 1, 2 and 3, the data record 132 contains the seven fields indicated. Also whether the field is Mandatory or Optional is also indicated with an M or O. The results of the functional analysis of data 124 are shown in the next column. For this example P implies Pass and F implies Fail. The values are shown for the seven fields. The Grade Assignment of Data 126 creates the field grading and the field rating. For this example grades two and five are shown and rating of GREEN and RED are shown. The Grade Assignment of Data 126 also creates the file grade and file rating. For this example the file grade is set to a three and the file rating is set to AMBER.

The Grade Assessment of Data 126 for this example used the reference tables 1-3, which contain the rules to be used for establishing the grade and rating the fields. For this example all mandatory fields received a grade of five and a coinciding rating of GREEN and all optional fields received a grade of two and a coinciding rating of RED. Based upon the field grade and rating the file grade and rating could now be determined. For this example since all mandatory fields are five and at least one optional field is a two then a file grade of three and a rating of AMBER was assigned. The rules to be used to grade and rate fields of files will be established by a community of interest which can be specific to a customer, a group of companies, an industry, etc.

The Signal Assignment 128 creates the signals that will be sent to the Data User 130. Referring to Tables 1, 2 and 3 there is shown an example of a record, file and corresponding functional analysis results and grades. In this example a label is added to the filename as another filename extension and the label will have two parts. The first part contains the file grade and the second part contains the file rating. The first part and the second part are separated by the underscore character (_). For this example, the filename would be sample.dat.3—amber. The signal assignment 128 for this example would create a field level signal that would contain the grade and rating for each of the seven fields. A file is created with a name that is composed of the original name plus a special file extension.

TABLE 1

| FIELDS | MANDATORY OR OPTIONAL | FUNCTIONAL ANALYSIS RESULTS | FIELD GRADING | FIELD RATING |
|---|---|---|---|---|
| Name | M | P | 5 | Green |
| Street | M | P | 5 | Green |
| City | M | P | 5 | Green |
| State | M | P | 5 | Green |
| Zip Code | M | P | 5 | Green |
| Telephone | O | F | 2 | Red |
| Gender | O | F | 2 | Red |

TABLE 2

| FILE NAME | FIELD NUMBER | GRADE | RATING |
|---|---|---|---|
| sample.dat.dmi | 1 | 5 | Green |
| | 2 | 5 | Green |
| | 3 | 5 | Green |
| | 4 | 5 | Green |
| | 5 | 5 | Green |
| | 6 | 2 | Red |
| | 7 | 2 | Red |

TABLE 3

| FILE GRADE | FILE RATING | FILE SIGNAL | FIELD SIGNAL |
|---|---|---|---|
| 3 | Amber | .3_amber | sample.dat.dmi |

The filename created by the Signal Assignment 128 is sample.dat.dmi. The contents of this file shown in Table 2. For each of the seven fields the corresponding grade and rating are presented. The file signal and the field signal can be transported to the data user by HTTP, FTP, E-MAIL, Directory entries, as well as a variety of other methods that are known to those skilled in the art.

The Data User 130 may be another digital system, an individual or organization, or a third party broker. The Data User 130 receives the DFIN 122, the two signals 128 and the original data. The data user can make a decision on the disposition of the data based upon the information continued in the signals. As an example the data user 130 could decide to not process the original data file if the grade is three or lower. The important aspect is that the Data User 130 can now make a more informed decision regarding the disposition of the data received before starting to process the data.

Through the use of the label the Data User 130 can without 'opening the data file' make a disposition decision. The fact that the label is appended to the file names reduces miscommunications issues regarding the condition of the data received. Using the field level signals the user can make a decision on a field-by-field data regarding the condition and trust that can be associated with the data. In one particular embodiment, the data 120 can be identified by a file name. The signal assignment 128 can also provide high level signaling by appending to the file name 136 or modifying the file name, which corresponds to the data 120.

In one embodiment the present invention is implemented to function as a data inspector providing information, which can be used to determine data integrity, validate database and assist in the cleanup of a database as well as monitor for garbage being sent between data users.

One exemplary embodiment of the present invention is a software system, which applies predetermined inspection functions to each identified data element. The results from the inspection functions are recorded. The recorded results are used to grade and rate the file using predetermined criteria; to report the results, and the grade and rating so designated parties of certain conditions are detected or determined. In this embodiment, the submission of the file contains a DIM label which can, for this submission, alter the predetermined parameters that control the specifics of the inspection, recording of results, grade and rating, reporting of the results, and alerts and notices. This feature enables the system to be used as follows: a data wall (preventing the forwarding of the file if necessary); continuous process data inspector; a common data inspection facility for a data exchange community; a unit data inspector for data exchanged by software units; a database inspector; a data collection device enabling data to be collected and reviewed prior to transfer; and data field notifier, wherein the quality of the data is qualified to the field level. The DIM label is a separate, optional set of data that can be included in the file submission. The form could be a label appended to the file name or a label sent in a message to the server.

The predetermined parameters that are used reflect policy, business rules, operation rules, technical rules mode (for example, production) of operation, recording requirements, grade and rating requirements, reporting requirements, and alerts and notices requirements. A label, which is created at the time of a submission request, contains a tracking number corresponding to the file, the parameters selected at submission time, and other information. The label can be appended to the file name.

Upon the completion of the data validation and monitoring process, another label is created which contains the results of the inspection (grade and rating for the file) and other key information about the DIM process. This data validation and monitoring label can also be appended to the file name.

A file can be submitted manually in an interactive mode or automatically using an application programming type interface (API) mode. One embodiment of an interactive mode uses a web browser. The API mode uses any software industry method possible that can handle the required protocol. A file for this embodiment can be a named document file, a named data file, with any type of file extension.

In yet another embodiment, the system handles unnamed sets of data elements. In yet another embodiment the submission service where streams/strings of data elements are received is not required.

The setup and configuration for the predetermined parameters, criteria, etc. enables customization of the process for each customer/account/user. This includes the specifics of each data element in a file as well as the specific set of inspections to be performed that comprise the inspection specifications for that file. The conditions of the data detected by the inspection function are reported in customized, customer/process specific terms in a log file for each file submitted.

The present invention, method and system for communicating data inspecting, monitoring and analysis information, can be used throughout the life cycle of application/system development. Starting with initial unit testing through integration testing and during production. This can be used to inspect data from any source, any form, and any type. The data only needs to be presented in a form where the data elements can be identifiable (or parsed) using techniques that those skilled in the art could implement.

The present invention, method and system for communicating data inspecting, monitoring and analysis information, can be introduced in any phase of a project/product life cycle. For example, if a project/product is already in production, then data validation and monitoring can offer a solution to a variety of issues that typically arise (new release of software is installed, a new technology is introduced such as Electronic Data Interchange (EDI)).

When a software project is in the development phase, then the various models previously described as well as a software unit inspector can be utilized. The earlier the present invention, method and system for communicating data inspecting, monitoring and analysis information, is introduced into the project life cycle, the greater the organization benefits, and the cost per transaction is reduced, and the cost of ownership per unit is reduced.

The present invention, method and system for communicating data inspecting, monitoring and analysis information, inspects data on an individual field-by-field basis (intra-field), and on a field-to-field basis (inter-field). Therefore, this inspection process can become business process aware to various levels, depending upon customer needs. The inspection functions performed on each data element will be embodiments of techniques that those skilled in the art could implement. For an example Visual Basic (VB) data type, what are the type of values that would: be considered a different data type; and, for that data type the values that could be present but their form and content can be classified to assist in determining the root cause of the problem value.

This would then help classify the different solutions that could be present in a field. An example of this is a text type field that was being used to store the name of a city. For this field, there may be certain constraints put on the field value. Examples include: greater than three characters; no backslash characters; no underscore characters; and, no space characters. This type of data filtering would be done prior to looking up the city name in a database for that zip code. There is the high possibility that the look up would fail, but all we could indicate would be "invalid value." It would be more informative for the root cause analysis if other characteristics of the value were identified that could assist in determining if this was a coding problem versus a user problem. Since data validation and monitoring also serves a diagnostic tool, the more explicit it can be in helping to root cause the issue would be a value add to the user.

In some circumstances there is a need for classifications that are more value based. An example of this would be if the value of a field was outside of the limits specified. As an example, assume the limits were a set, such as from 5 to 10. An indication could be "value outside of limits," rather than the generic "invalid value." Therefore, a sub data type could be "range of values" or a "set of values."

In present invention, method and system for communicating data inspecting, monitoring and analysis information, an inspection function library is used. For each data element, the associated inspection functions to be performed are identified and stored. Additional inspection functions can be dynamically added to the library as desired. The capability for customized inspection functions for a data customer thus is provided.

Inspection functions can use external sources as sources of information. These external sources can be databases supplied by others using various media (for example, CD-ROM). They can also be other information sources that are accessible through a local area network, wide area network, or a global network. The information obtained from these sources can be static or highly dynamic enabling the particular type of inspection accordingly. For each session, standard authentication methods are used for security identification rights and privileged purposes. Operating metrics, results, and statistics are maintained on a customer and overall basis. Reports on this information are made available through a browser and other standard reporting methods.

The present invention, method and system for communicating data inspecting, monitoring and analysis information, can be better understood by looking at a detailed illustrative embodiment.

Input Section (Assume no exceptions)

Read the file and store in the input directory. Create a corresponding blank log file using the name of the input file with the extension of log. Read the DFIN (label), which contains all the information that the original data source submitted. Included are the DIM label and other process control information. Using the DFIN (label), determine the intended disposition of:

input file; log file; and DFIN.

Then at the completion of the processing set all switches accordingly.

Using the DFIN determine the level of analysis to be performed. Set up all appropriate switches and pointers accordingly.

Using the DFIN determine the special instructions specified and set all appropriate switches and pointers accordingly.

Create and input package by assigning a unique input sequence number to the input file and the DFIN.

Validation Section

If the file length in the header record does not equal the length of the file read in, then execute the rule for this condition in the exception condition table.

For the first field of the record/row execute the associated VIEC Rule. The VIEC Rule specifies the validation/inspection/edit/checking function(s) that will be applied against each field.

If the rule produces an exception condition then execute the assigned rule in the exception condition table.

Repeat for all fields in the record.

Read in the next record.

Determine the record type for the record and select the corresponding VIEC table and exception table.

For the first field of the record/row execute the associated VIEC rule

If the rule produces an exception condition then execute the assigned rule in the exception condition table.

Repeat for all fields in the record.

Repeat above for all records/rows in the file.

Continue to the create log section when completed.

File Header and Trailer Validation

Verify File Name Is Valid

File name structure is per spec.

Any parts of the name are per spec (may be separate from header).

Sequence number if present is acceptable.

Other

Verify File Header

File header structure is per spec.

Is valid for the file name

All computed fields are correct (ex.—record count).

All other fields are acceptable (ex.—creation date is not in the future).

Is valid for the record types in the file

Expected blank areas/fields are blank (ex.—binary zero).

Other

Conditions detected will be classified, for example as:

Informational—Condition was detected; no known impact (blue)

Warning—Condition was detected that may impact results (yellow)

Error—Condition was detected that can/will impact results (red)

Log File Entries

Will have a variety of record types

Will be a flat file

The records may be a variable or uniform length.

The record types include:

Header record and environment data

Error code

Event record (event code, date and time, process ID)

The log file will have the file name of the input file name.log (include extension).

Pop Up Window

Will pop up and close for each process

Miscellaneous message will appear that relate to log file entries and status of processing.

Record Validation

The Level I check:

The record will be using typical MS Access data dictionary type attributes for fields (type, mandatory, etc.).

The record will be checked for proper length and filler space.

The Level II check will include those field-related issues that experience has shown cause problems and confusion. This includes: zero field characters; blank field characters, etc.

All exceptions will be logged and the processing will continue.

The process will not be "using" any of the data in the fields (strictly a validation-type process).

The Level III check will be application-aware and, as a result, will check individual field values. These checks will include:

Specific allowable values (ex. 1A)

A possible technique would be to do a look up on the field in a table

Either a denial philosophy (nothing passes if it is not explicitly validated) or a permissive philosophy (everything is passed unless it is specifically denied for a level) could be used (must decide).

The Level IV checks will validate field-to-field relationship within a record. (Ex.—If one field has a specific value, then another field can only have a specified set of values.)

There are more application aware checks that acknowledge the inter-dependency between fields.

Some technique needs to be developed/selected that addresses the issue of building the knowledge base and processing for all the level checks.

A permissive philosophy could be used.

Level V checks will validate the field-to-field relationships in/between different records in the same file.

A permissive philosophy could be used (i.e.—all passes if no checks are selected).

Level VI, which most likely is not practiced, is to validate data between files.

Levels IV, V, and VI are not to be programmed but may be considered in the approach and design of Levels I, II, III.

Create Log Section

Populate all fields in the log header record per specification.

Move the DFIN into the corresponding field in the header record.

Close the log file.

Continue to the output section.

Output Section

Create an output package by assigning a unique output sequence number to the input rule and log file.

Figure 3:
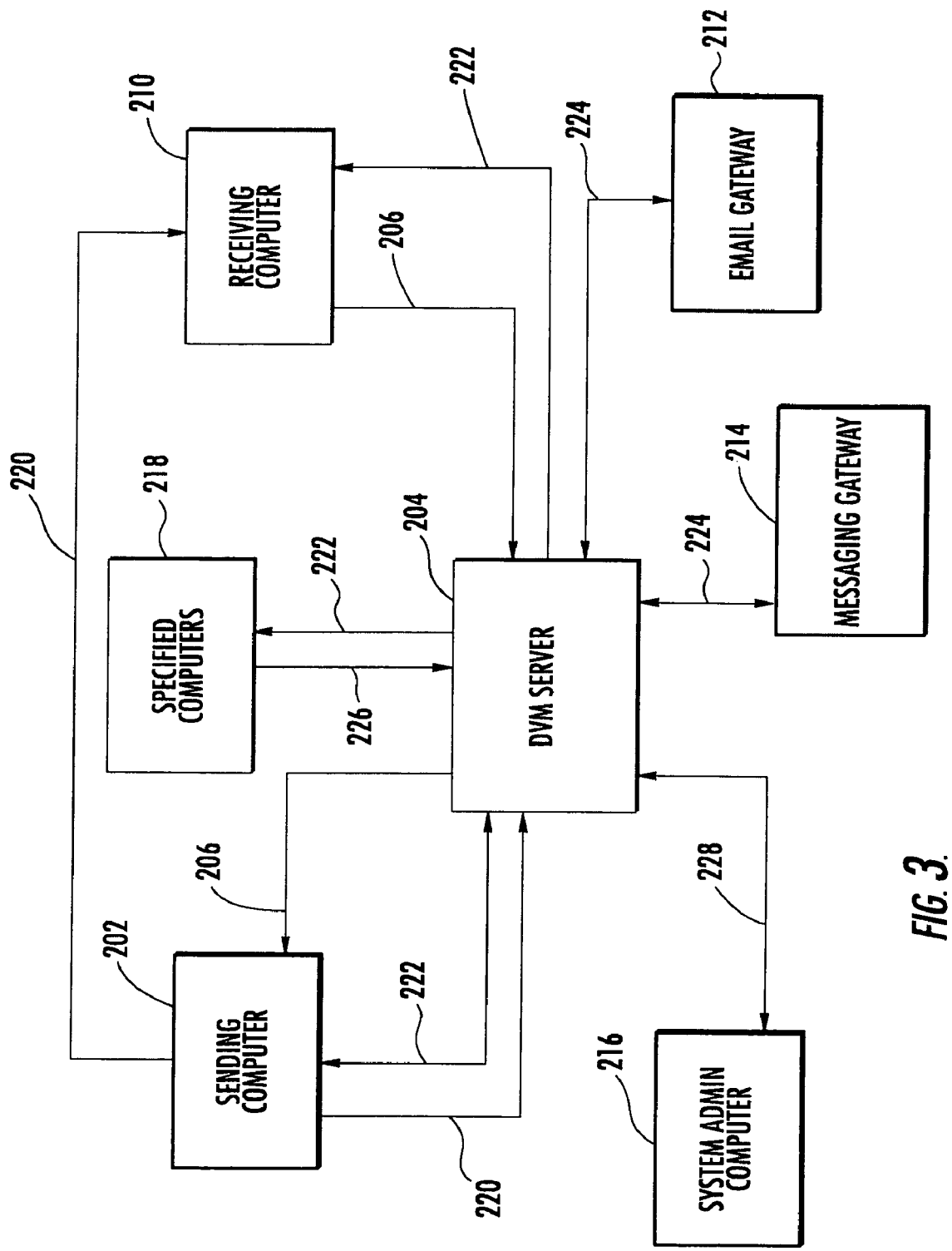
FIG. 3 is a block diagram for the sending computer in FIG. 1.

Referring to FIG. 3, there is shown one example a high-level block diagram of the overall check process for a field. The sending computer 202 generates a submission request and sends it to the data validation and monitoring (DVM) server 204. The data validation and monitoring server 204 returns to the sending computer 202 the document/file a tracking number and an encoded data validation and monitoring label. This encoded label contains the options parameters and other selections that were specifically requested for this submission request.

The sending computer 202 appends the data validation and monitoring label to the name of the document/file that will be submitted. The sending computer 202 then submits the file name with the appended label and the document/file to the data validation and monitoring server 204. (This can be a push or pull process.)

The data validation and monitoring server 204 receives the submission and processes it using the information contained in the submission and predetermined information that was stored when the customer and this document/file were set up and registered in the data validation and monitoring server.

For the customer setup, all the information required to process a submission is registered and stored as predetermined information in the data validation and monitoring server 204. This predetermined information will be used for every submission made by the customer and determines the specific processing to be performed for all submissions. The information is also used to determine what options and parameters can be selected for a specific submission.

The setup requires that the customer pre-register each document/file name, selecting the specific inspections to be performed on each data element of the submission.

The reporting options for the results of the inspection are selected and stored in the registry. The notification options based upon the results are selected and stored in the registry. The grading to be performed on the results is selected and stored in the registry.

The data validation and monitoring server 204 processes the submission using the predetermined information stored from setup and contained in the DFIN File.

The full results 206 are returned to the sending computer 202.

The document/file submitted 222 can be sent to the receiving computer 210 based upon a combination of the customer setup information 228, label information XXX, and the results of the inspections 206. The data validation and monitoring Server 204 is coupled to an e-mail gateway 212, which transmits the DVM notices to the appropriate recipients messaging gateway 214, system administrative computer 216 transfers the setup and configuration selection 228 to the DVM server. The various specified computers 218 can receive the data submission 222 and transmit back to the server the results 226.

Figure 4:
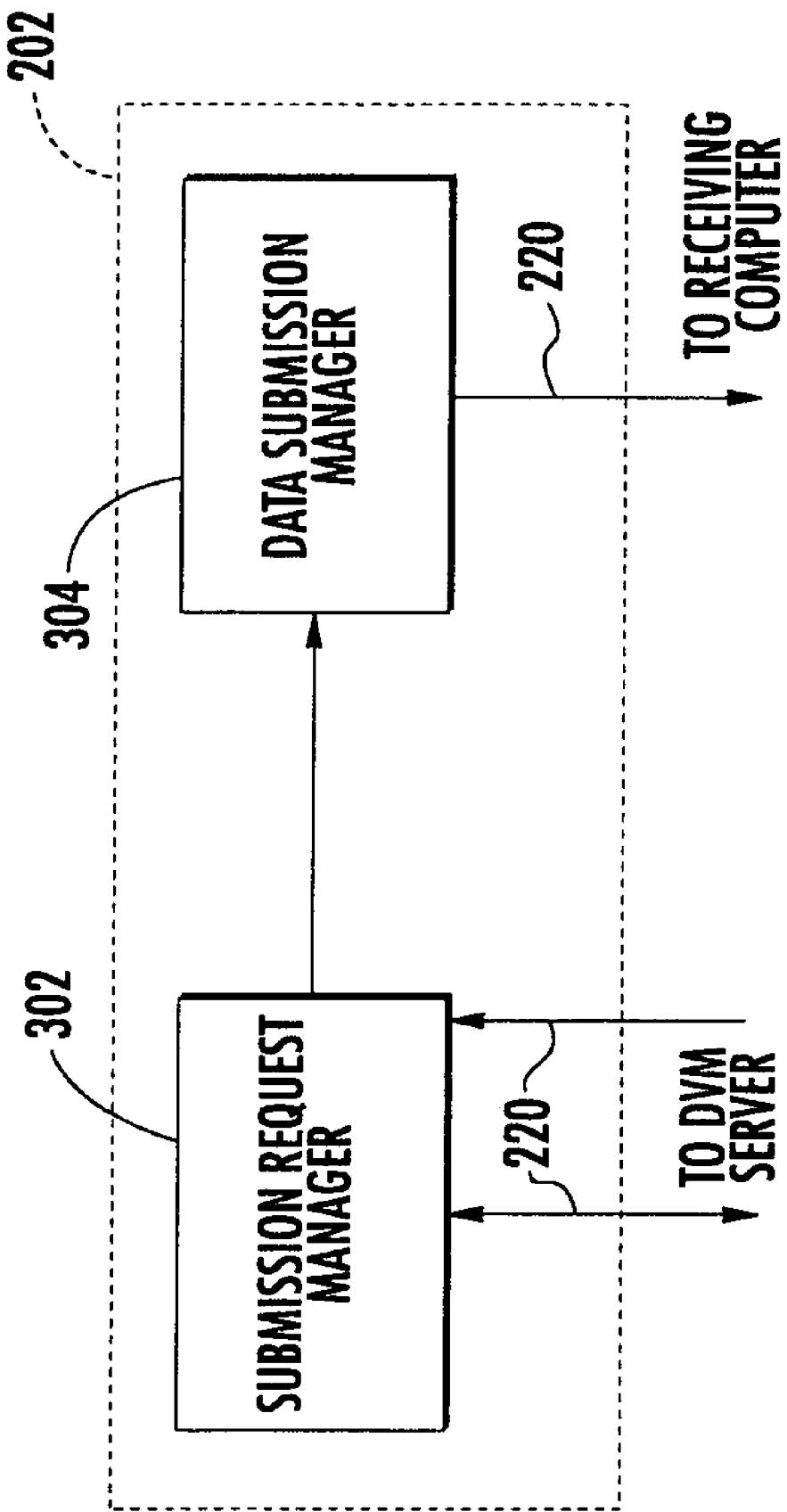
FIG. 4 is further detail of the submission request manager in FIG. 3.

Referring to FIG. 4, there is shown a block diagram for the sending computer 202 in FIG. 3. A submission request manager 302 handles for example the interaction that occurs between the sending computer 202 and the data validation and monitoring server to get authorization to submit a submission request 220. Once the authorization is received in the form of the input label, the actual data submission 222 of the file is handled by the data submission manager 304. The data submission 222 can also be transmitted to the receiving computer 210.

Figure 5:
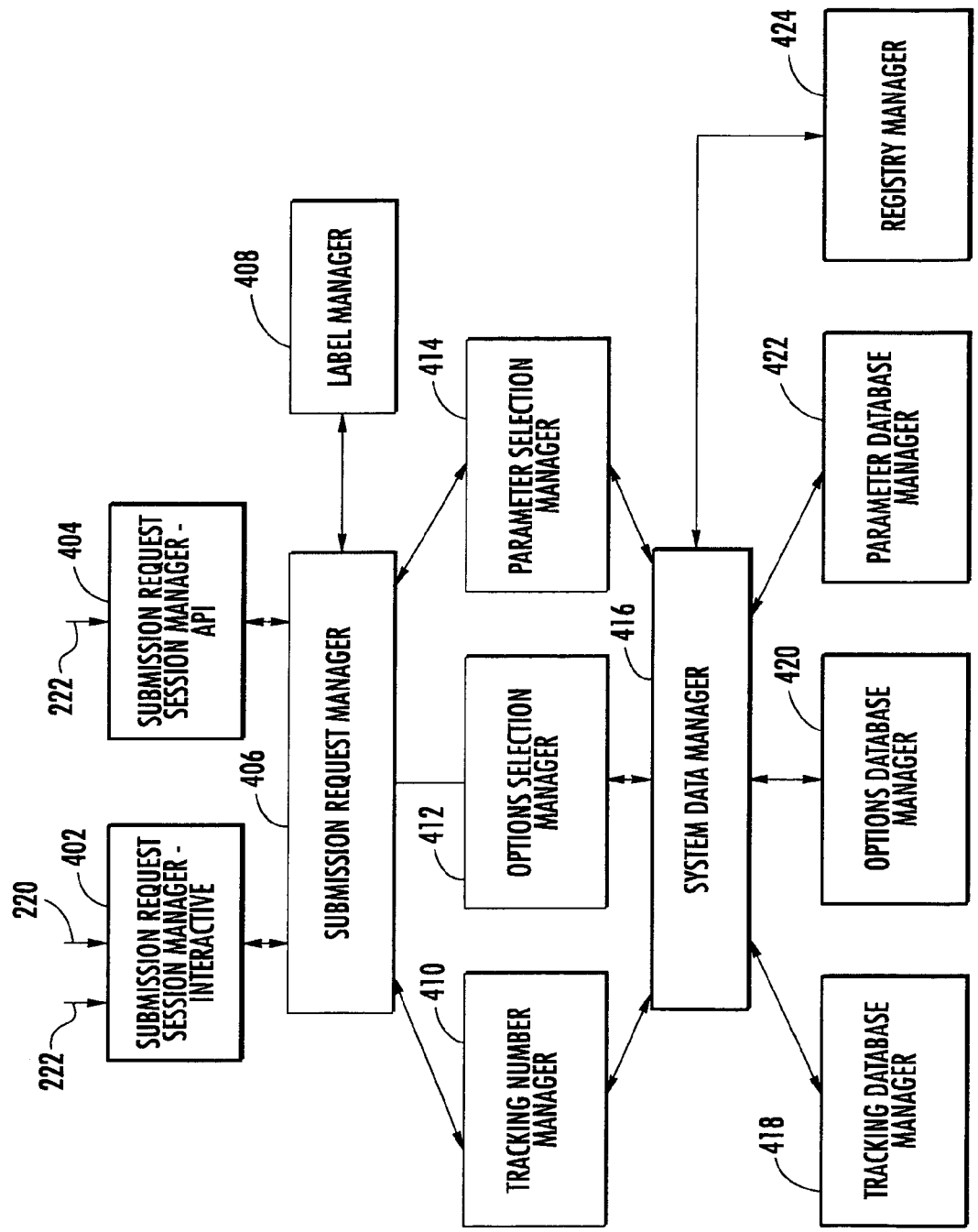
FIG. 5 is a detail of the system administrator to register a customer.

Referring to FIG. 5, there is shown further detail of the submission request manager 302 in FIG. 4 as can be seen are type of request called interactive. For this embodiment this is a manual process where a browser type program is used to submit a submission. For the API type submission for example a full automatic dialogue occurs between the sending computer 202 and the data validation and monitoring server 204. The label may create the input label, which is part of the submission and an output label, which is a result of the data validation and monitoring process. The tracking number manager 410 assigns a unique tracking number for the submission that will be included in the label option selection for this submission and provides info to the label manager 408. The parameter selection manager 414 determines what parameters were selected for this submission and provides that information to be label manager 408. The system data manager 416 controls all interface to the databases 418, 420 and 422 shown. The registering manager 424 continues all the information that was collected when the setup for customer process, file was performed.

Figure 6:
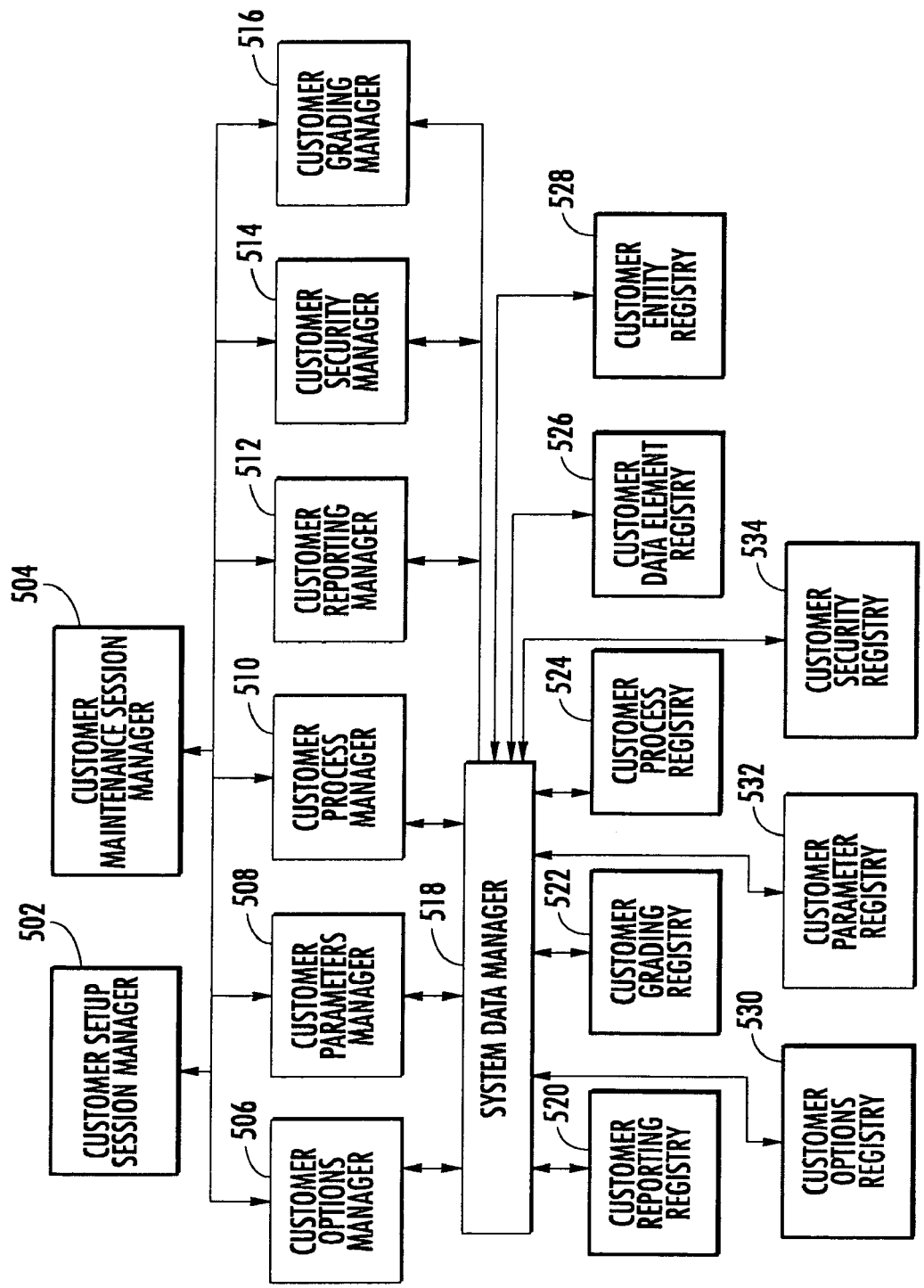
FIG. 6 is part of the customer process manager.

Referring to FIG. 6, there is shown, a detail of the system administrator computer 216 to register a customer is detailed in this section. This is a prerequisite for processing data to be submitted by the customer. This has two functions, one is the customer setup session manager 502 and the other the customer maintenance session manager 504. The customer process manager 510 registers each process that a customer will use. For example there could be a EDI order entry process and an EDI inventory process. The customer reporting manager 512 registers what reporting options that the customer has selected. Examples are machine portable (PDF, etc.), spreadsheets, paging, and e-mail. The customer security manager 514 registers who are the allowed users, their identification methods and what privileges they will have. The customer grading manager 516 registers what grading and rating schemes will be used at the file level and at the field level. The system data manager 518 controls all the interfaces for the data shown stored in various databases and forms including: customer reporting registry 520; customer grading registry 522; customer process registry 524; customer data element registry 526; customer entity registry 528; customer options registry 530; customer parameter registry 532; and, customer security registry 534.

Figure 7:
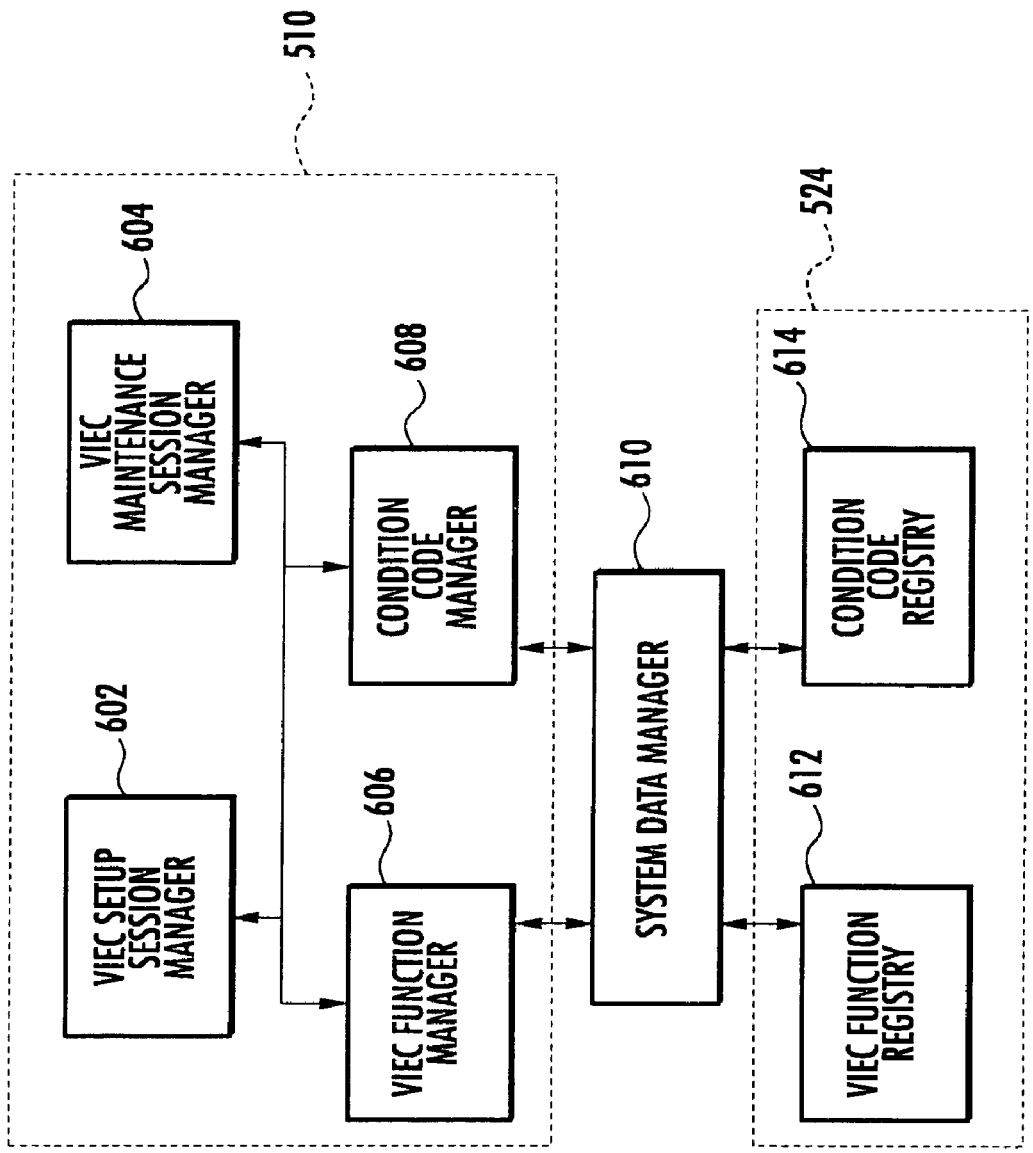
FIG. 7 is a block diagram for the customer process manager in FIG. 5.

Referring to FIG. 7, there is shown part of the customer process manager 510. The VIEC (Validation, Inspection, Examination, Checking) to be performed on each data element is registered here. The VIEC setup session manager 602 and VIEC maintenance session manager 604 are similar to FIG. 5. The VIEC function manager 606 registers each individual VIEC function that will be executed for the specific data element. An example would be to check for valid values. The condition code manager 608 determines what condition code and explanation will be recorded for the various conditions detected by the VIEC process. The system data manager 610 (518 in FIG. 6) controls all the interfaces for the data shown stored in various databases and forms including the VIEC function registry 612 and the condition code registry 614, which are part of the Customer Process Registry 524.

Figure 8:
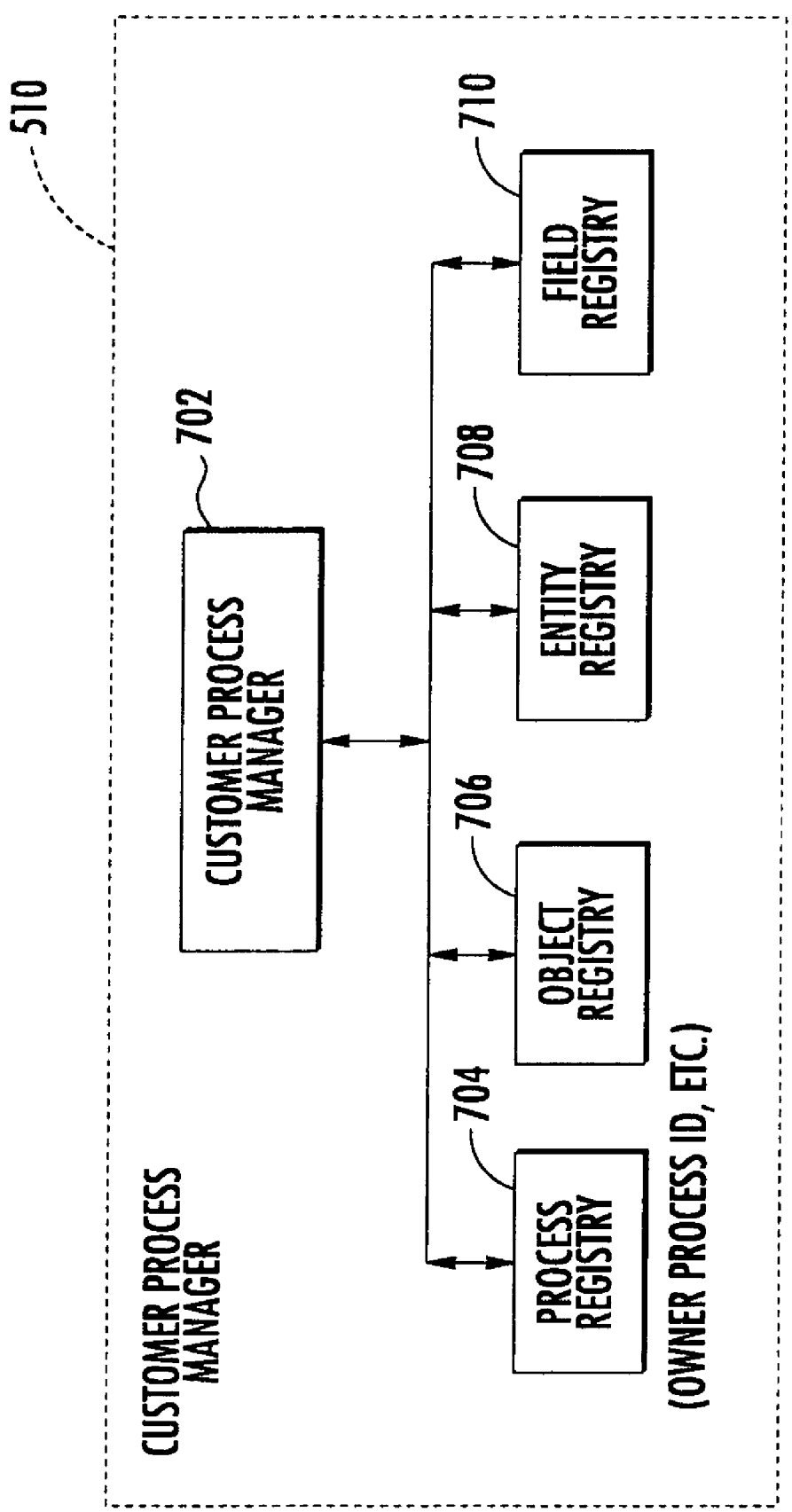
FIG. 8 is a block diagram of the customer reporting manager in FIG. 5.

Referring to FIG. 8, there is shown a block diagram for the customer process manager 510 in FIG. 6. The customer process manager 702 interfaces with the process registry 704, the object registry 706, the entity registry 708, and the field registry 710.

Figure 9:
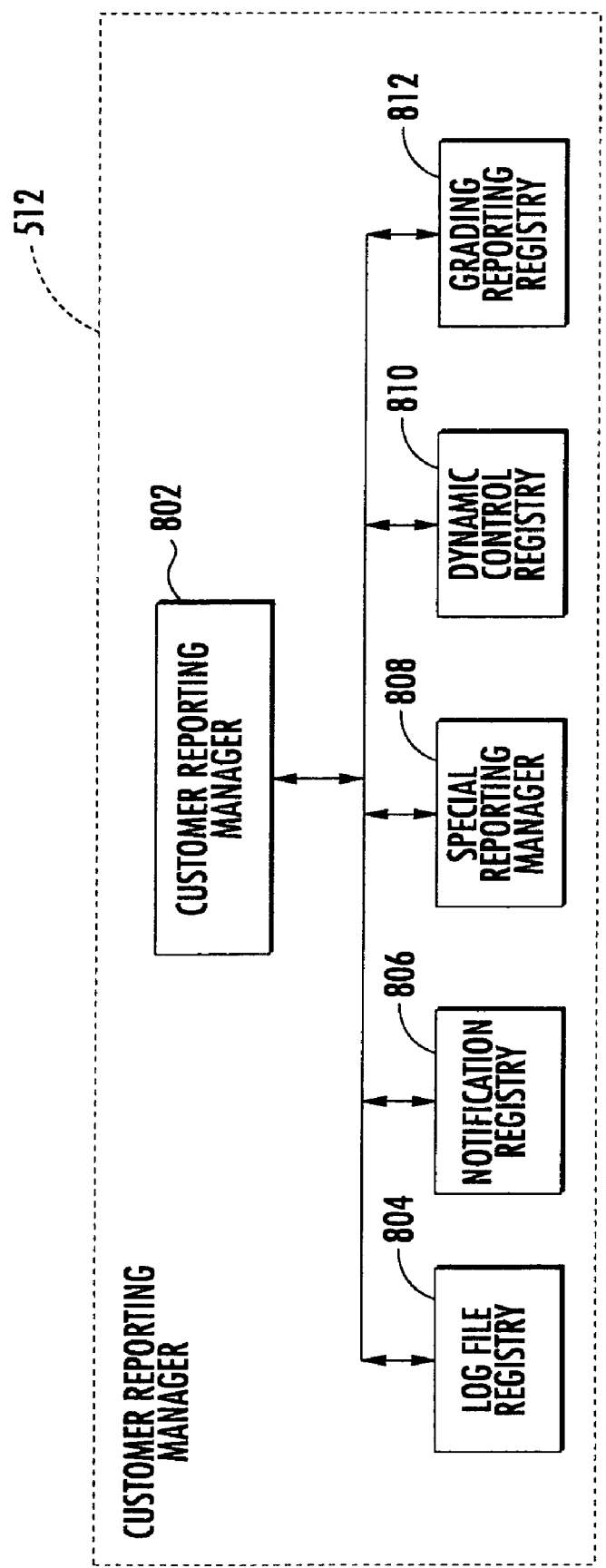
FIG. 9 is a block diagram of the customer coding manager in FIG. 5.

Referring to FIG. 9, there is shown a block diagram of the customer reporting manager 512 in FIG. 6. The customer reporting manager 802 interfaces with the log file registry 804, the notification registry 806, the special reporting manager 808, the dynamic control registry 810 and the grading reporting registry 812.

Figure 10:
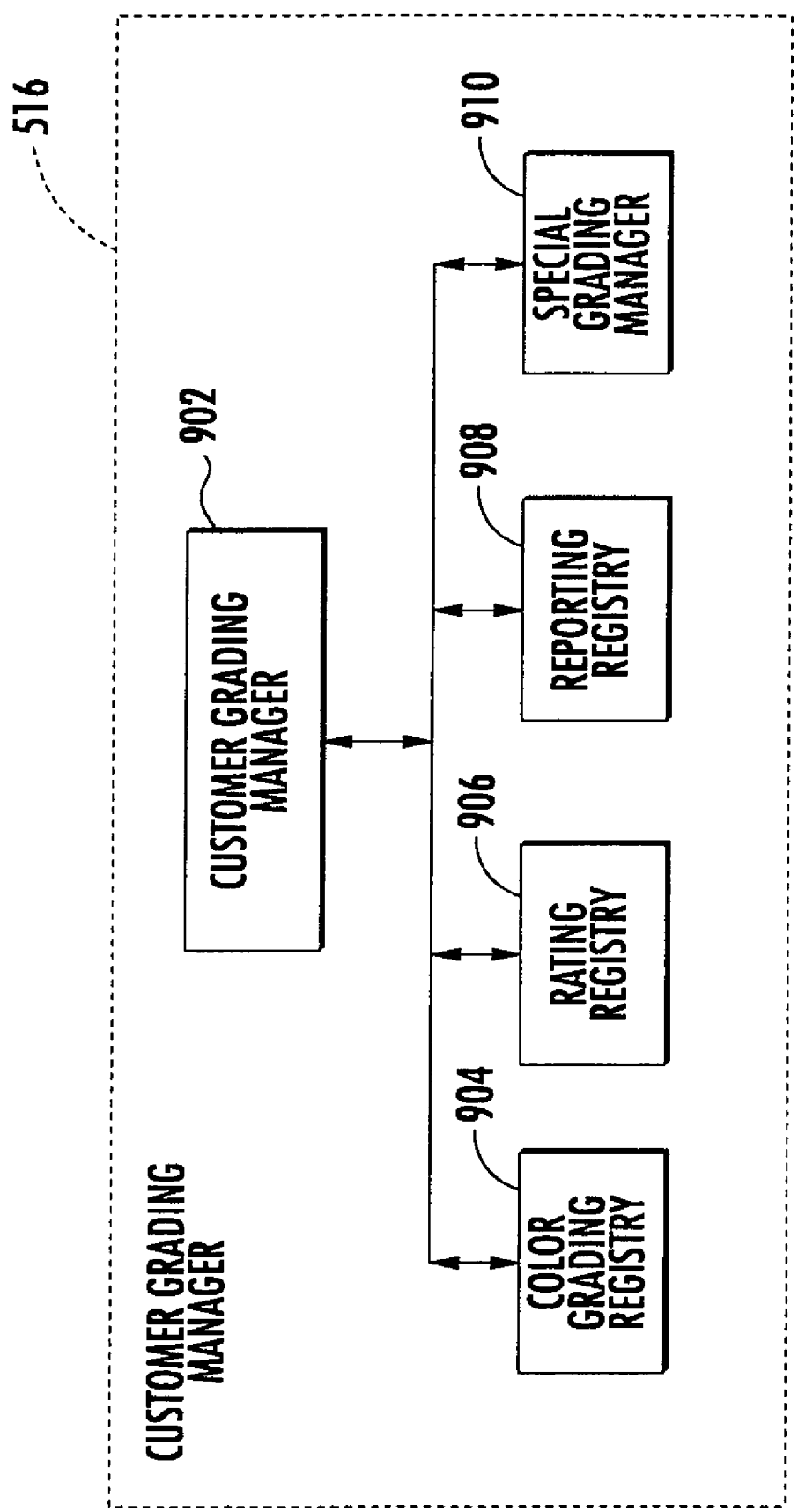
FIG. 10 is a block diagram of the customer security manager in FIG. 5.

Referring to FIG. 10, there is shown a block diagram of the customer grading manager 516 in FIG. 6. The customer grading manager 902 interaces with the color grading registry 904, the rating registry 906, the reporting registry 908 and the special grading manager 910.

Figure 11:
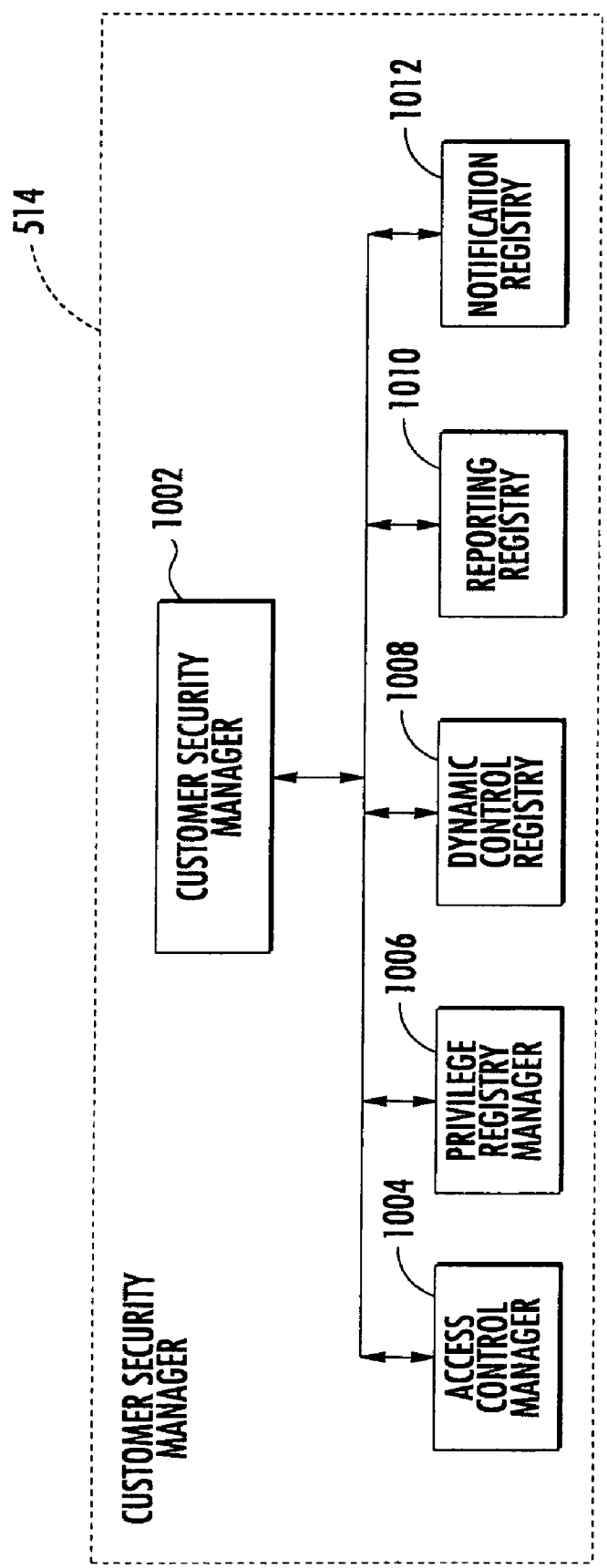
FIG. 11 is a block diagram in the customer options manager in FIG. 5.

Referring to FIG. 11, there is shown a block diagram of the customer security manager 514 in FIG. 6. The customer security manager 1002 interfaces with the access control manager 1004, the privilege registry manager 1006, the dynamic control registry 1008, the reporting registry 1010 and the notification registry 1012.

Figure 12:
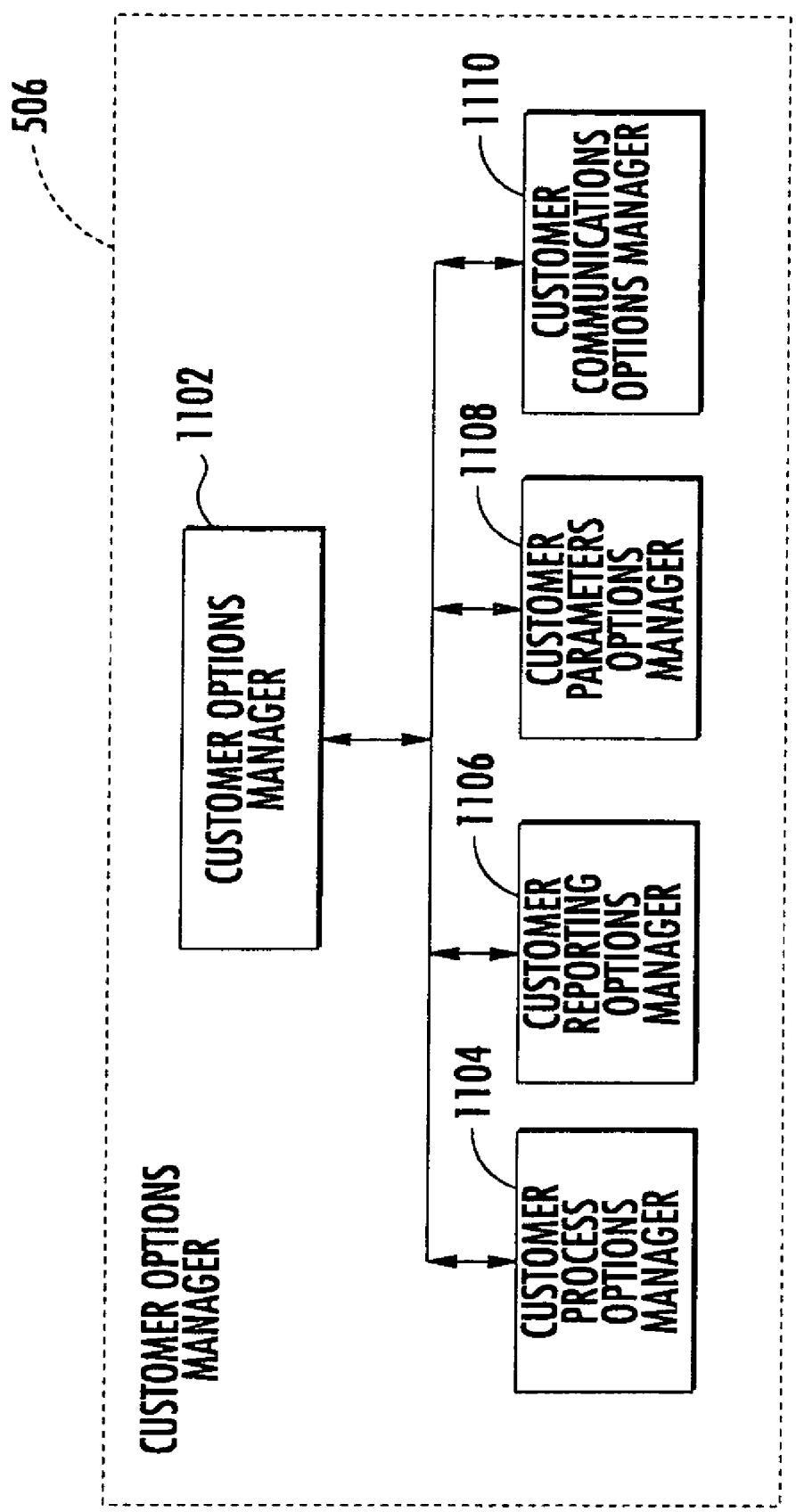
FIG. 12 is a block diagram of the customer parameters manager in FIG. 5.

Referring to FIG. 12, there is shown a block diagram in the customer options manager 506 in FIG. 6. The customer options manager 1102 interfaces with the customer process options manager 1104, the customer reporting options manager 1106, the customer parameters options manager 1108 and the customer communications options manager 1110.

Figure 13:
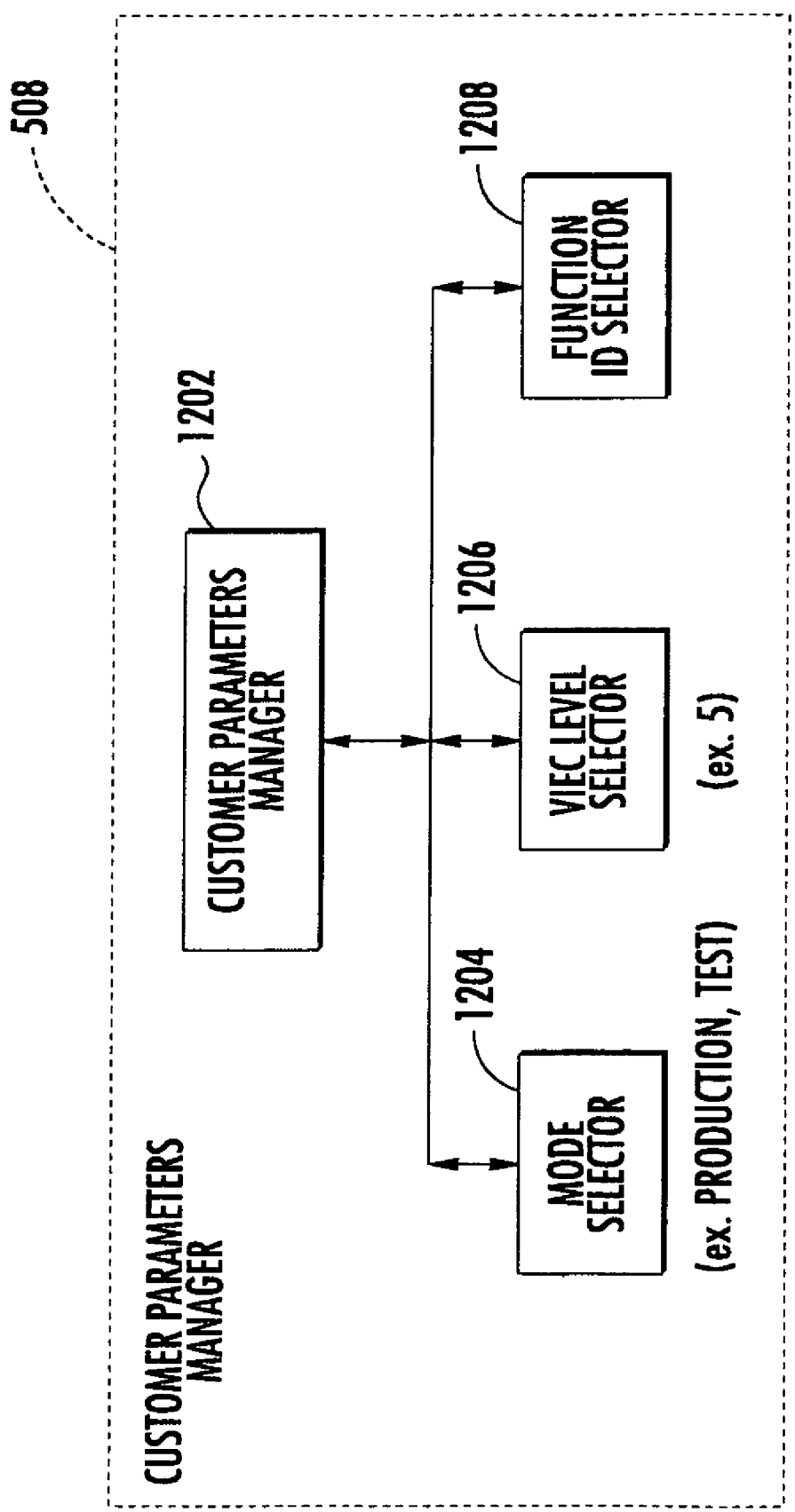
FIG. 13 is a block diagram for part of the customer setup sessions manager.

Referring to FIG. 13, there is shown a block diagram of the customer parameters manager 508 in FIG. 6. The customer parameters manager 1202 interfaces with the mode selector 1204, the VIEC level selector 1206 and the function ID selector 1208.

Figure 14:
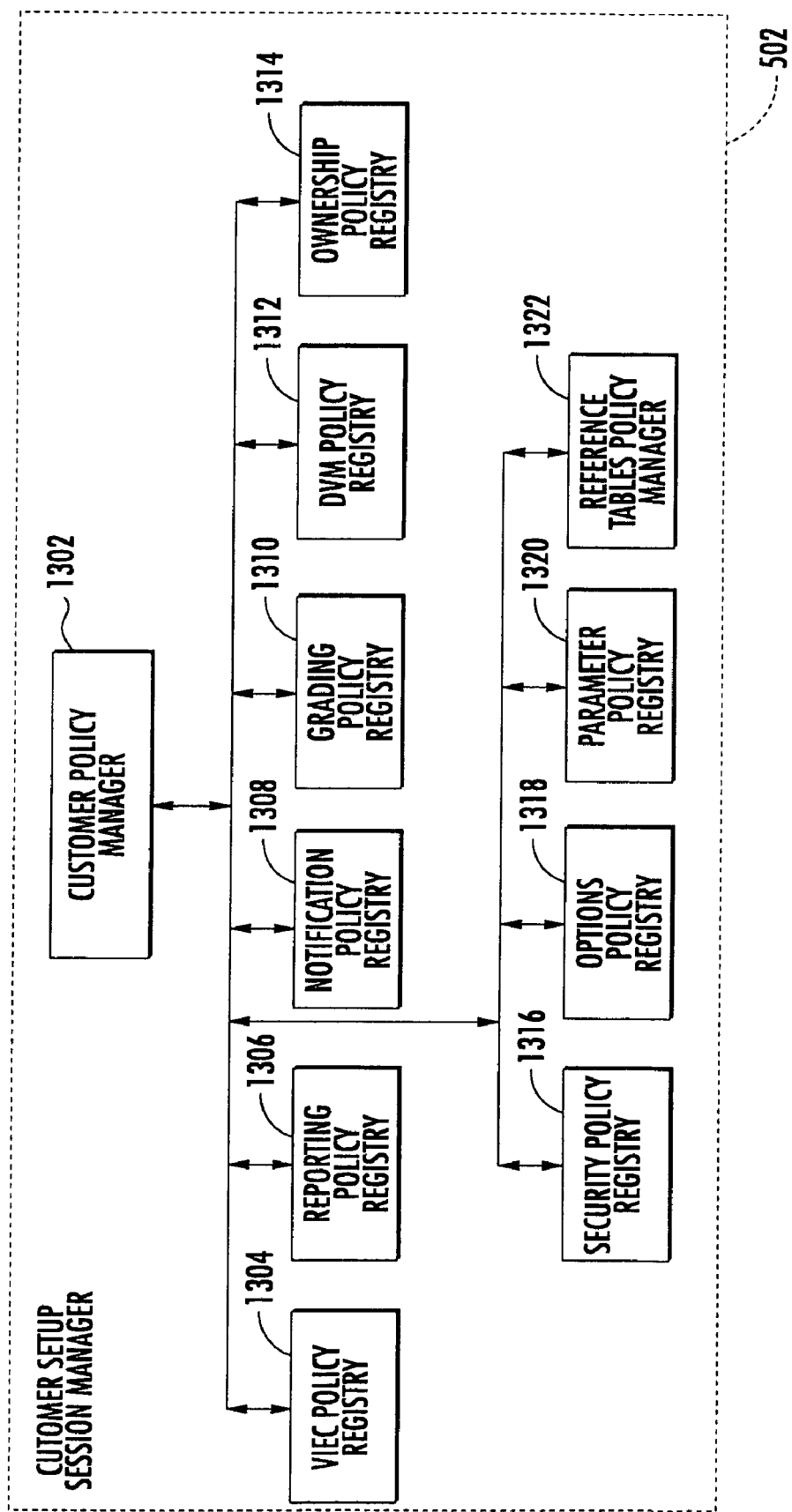
FIG. 14 is the reference data is used to determine if valid values are present for a data element.

Referring to FIG. 14, there is shown a block diagram for part of the customer setup sessions manager 502 in FIG. 6. The customer policy manager 1302 interfaces with the VIEC policy registry 1304, the reporting policy registry 1306, the notification policy registry 1308, the grading policy registry 1310, the DVM policy registry 1312, the ownership policy registry 1314, the security policy registry 1316, the options policy registry 1318, the parameter policy registry 1320 and the reference tables policy manager 1322.

Figure 15:
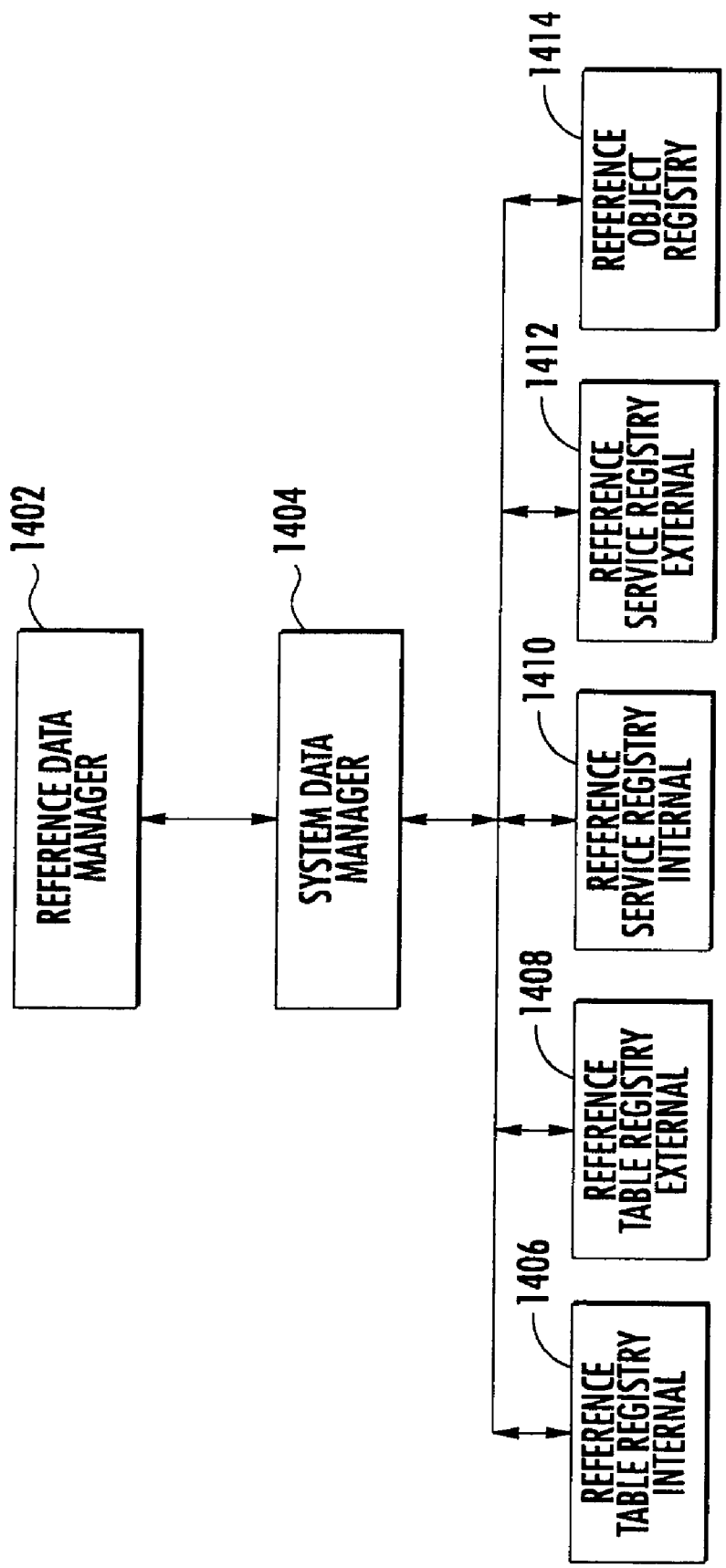
FIG. 15 is a block diagram that defines the submission of data where a prior submission request has been accepted.

Referring to FIG. 15, there is shown the reference data is used to determine if valid values are present for a data element. The reference data manager 1402 interfaces with the system data manager 1404. The system data manager 1404 controls all the interfaces for the data shown stored in various databases and forms including: reference table registry internal 1406; reference table registry external 1408; reference service registry internal 1410; reference service registry external 1412; and, reference object registry 1414. This data can be in a variety of forms and from a variety of sources. The internal registry tables represent data that is generated within the customer's organization. An example would be allowable transaction types. The external registry table would represent data from some other organization. An example would be zip codes from the U.S. Post Office. The service registry internal is to use data located on servers, CD ROM drives, etc. for this purpose. An example would be allowable part numbers. The service registry extended is where for example data is located on a web site. An example would be the market price for an item. The object registry is where the forms of data to be processed are determined. An example would be an unlabeled data stream received on a specific port.

Customer Registration

Figure 16:
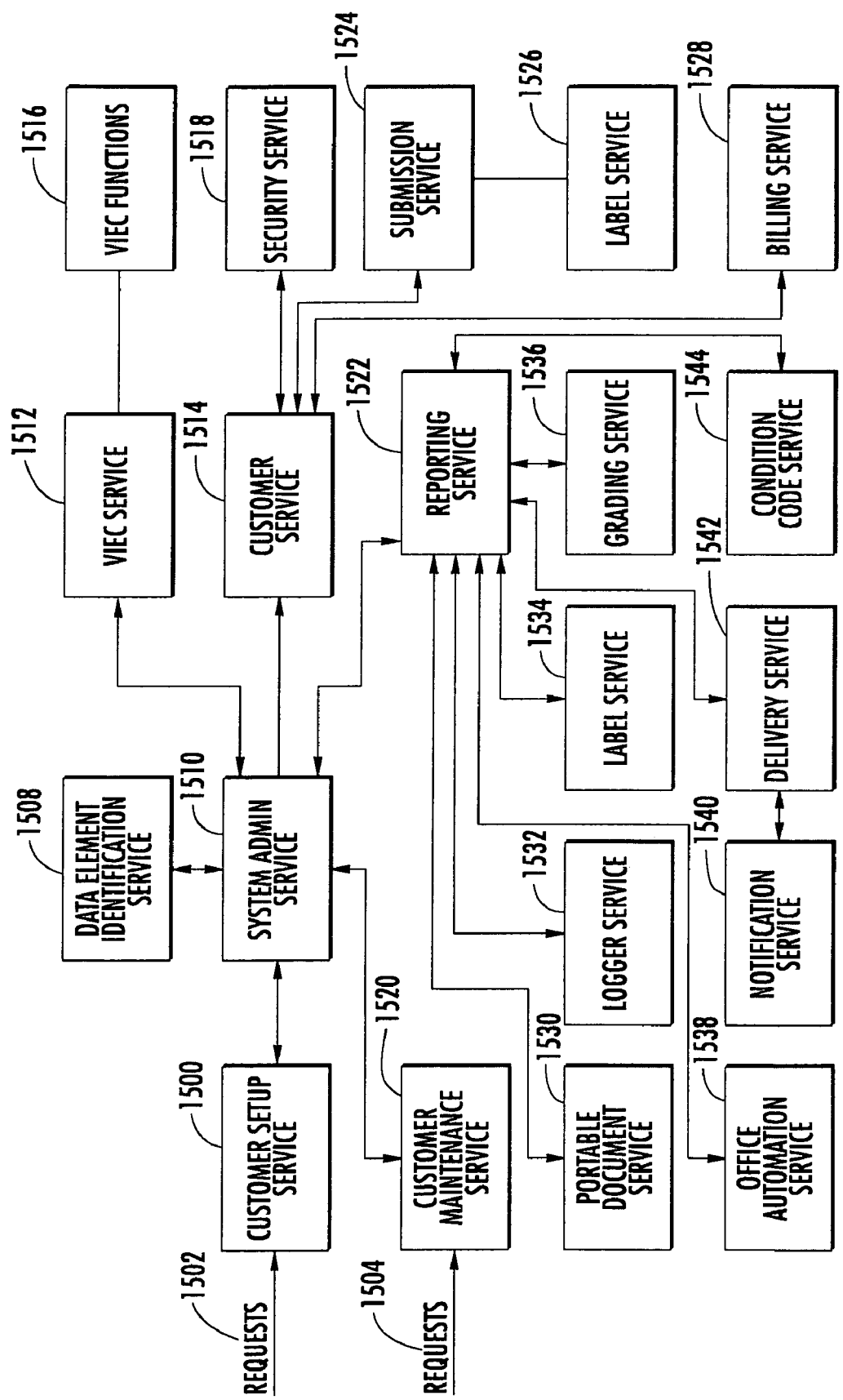
FIG. 16 is a block diagram for the customer registration process.

Referring to FIG. 16, a data validation and monitoring customer service person, using system administration services would register a customer with the data validation and monitoring service using the customer setup service. All information regarding the services selected to be provided for all submissions, the customer processes, all associated data objects, and the specifics of the inspection and each data elements are specified. In addition the types of submission (e.g. Inter-Active), security services selected for both user access and reporting and label services are also specified using the system admin services. The reporting services for grading of the results, delivery of reports, log files are performed through the delivery service. Special notifications for reporting results using email, paging, and messaging service are provided through the delivery service. The billing services establish the pricing to be used for the various services rendered, resources used, and priority selected. A request to setup a new customer 1502 initiates the customer setup service. The customer setup service 1506 is used to establish a new customer for the application. This can handle specific customer setup issues such as centralized and billing issues. The Data Element Identification Service the data 1508 is used to determine how the data element will be isolated for processing (ex. parsed) with all the specifics needed to accomplish the same. The VIEC Service 1512 is used to establish the VIEC Functions 1516 that will be applied against each data element. The Customer Service 1514 interfaces with the Security Service 1518 to setup authorized users, user privileges and restrictions. The Submission Service 1524 is used established the particulars of non-interactive and interactive data submissions. The Label Service 1526 is used to establish for the customer the types and contents of the labels that will be input. The Billing Service 1528 is used to establish the billing criteria and to accommodate data for the billing of the use of the application. The Reporting Service 1522 interacts with the System Administration Service to setup or change the various reporting functions. The Portable Document Service 1530 established the type (ex. PDF) and which reporting will use this type of service. The Logger Service 1532 established the type and contents to be logged for each transaction. The Label Service 1534 establishes the type and contents of the labels to be generated. The Grading Service 1536 establishes the type and rules to be used to established the grade and rating of the files and/or the individual fields. The Office Automation Service 1538 is used to select what type of output file (ex. Excel) will be used to present the various outputs (ex. logger) that are generated by the system. The Delivery Service is used to setup the types and forms of delivery that will be used for the outputs generated by the systems. The Notifications Service establishes the specific of notifications (ex pagers) and the specific model (ex Skytel) to be used for all notifications. The Grading Service 1536 establishes and prepares grading and rating results to be used by the reporting service. The Condition Code Service 1544 establishes customer specific conditions codes that will be used to report customer specific terms. The conditions detected by the VIEC Service or other services used for processing the data. A Customer Maintenance Request 1504 indicates a change to the customer setup information. The System Administrative Service 1510 is used for this function.

Any changes subsequent to the customer registration would be performed using the customer maintenance service. The authorization required to make specified changes (add, updates, deletes) were established at the time of set-up.

Private Mode—Administrator controls certain functions for senders, billing, publishing.

Public Mode—Where senders make submission requests, make changes to selected options & parameters, and submit the data to be processed.

Account Manager Component—A shared service that keeps information that the customer has subscribed to and information about the data the data validation and monitoring server has processed for the customer. The design also incorporates information about the destinations of the results of the data validation and monitoring processing.

Process Stages—A process can advance through the life cycle stages of development and production. These stages can be assigned on an object/file basis (e.g. A new file for a process can be in test mode)

Non-Invasive Inspection—data validation and monitoring is non-invasive because it is a read only process that does not change any of the data submitted. Thus the file contents are "as received." Any labels are appended to the file name.

Data validation and monitoring Label—For submission an electronic label is added to the name of the file submitted. For the submission this label reflects special instructions that will over ride the pre determined options & parameters established during customer set up & maintenance. For delivery the electronic label contains some information regarding the results of the data validation and monitoring process. This enables the recipient to make certain decisions about the handling of the data based upon the label content (e.g. if the color grade is red the recipient would decide to not accept the data for processing.)

Data Format—The format of the data can be in industry standards including EDI and XML. The data would be in flat files and could have various methods to isolate and identify data elements. (e.g. comma delimited files to be processed.)

Portable Documents—All reports can be converted to a portable document format (ex. Adobe PDF) for storage and transmission. This would preserve the format and fidelity of the information contained within.

Machine Readable Documents—All reports can also be produced in standard industry format such as EDI, XML, comma-delimited files etc. This will enable the receiver to process this information election and at the same time adhere to the K.I.D.S. principle.

Office Automation Formats—All reports can also be produced in standard spreadsheet and word processing document (ex. MS Excel, MS Word). This enables the recipient to automatically read this information to other computer-based systems.

Security of Information—The security of the information can be assured by a variety of industry standard methods. These include encryption (PKI) and SSL. This will be for information received or sent by the data validation and monitoring server.

Data Validation and Monitoring Transaction Service

Figure 17:
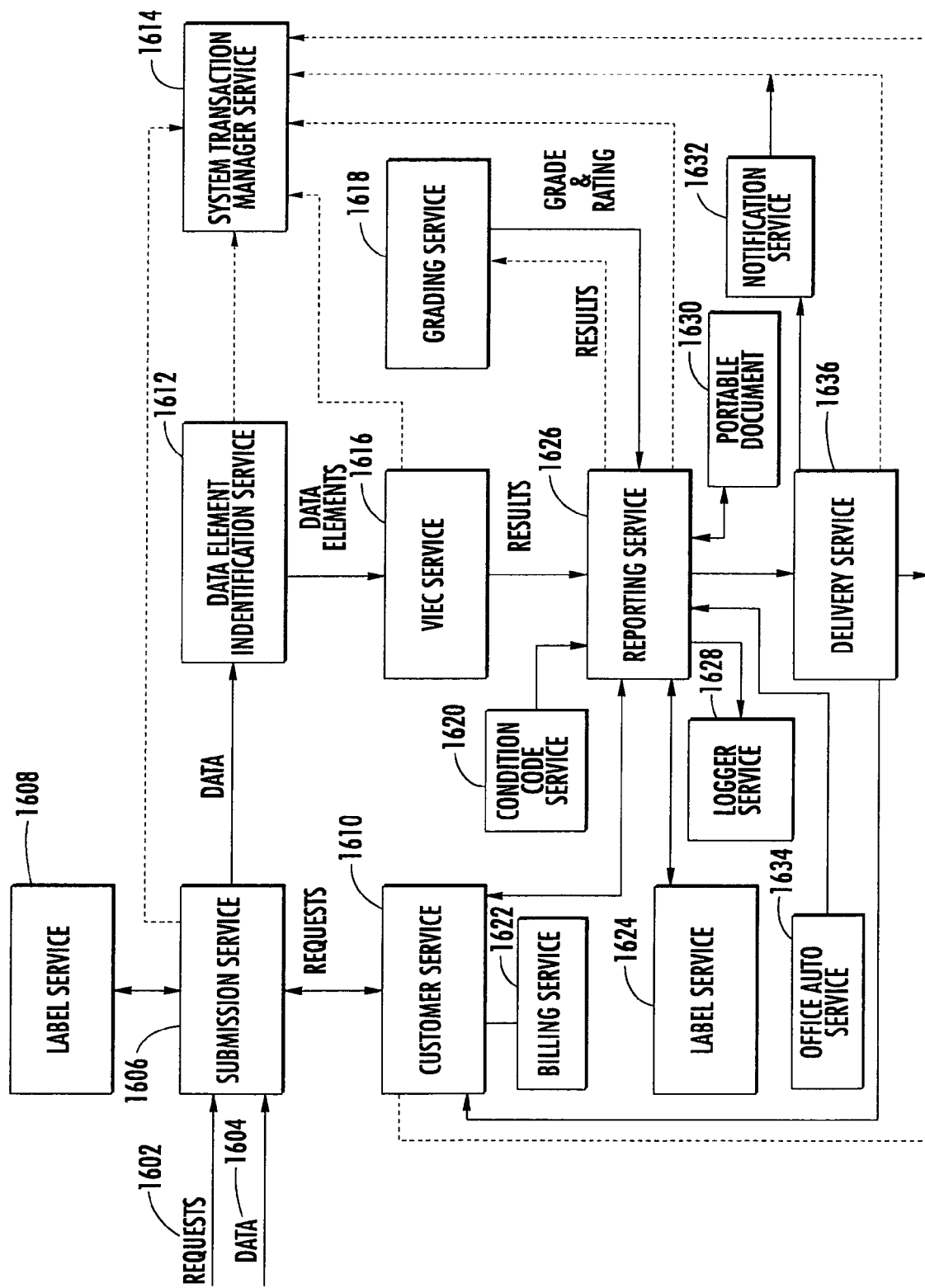
FIG. 17 is a block diagram for a transaction service.

Referring to FIG. 17, a transaction is defined as a submission of data 1604 where a prior submission request 1602 has been accepted. The user uses a submission client for the submission of the request 1602 and the submission of the data 1604. The client is a standard industry browser with some custom code. The custom is either a Java Applet, active X control, etc. The Submission Service 1606 uses the customer service 1610 to determine what customization of the service is allowed at this time, and if the data to be submitted is associated with a registered process for the customer. The applicable billing aspects for this transaction are established using the billing service 1622. The customized reporting requirements for this transaction are validated with the reporting service 1626.

The tracking numbers provided for the submission along with the submission label provided to the user are recorded with the system transaction manager service 1614. The submission of the data can occur any time after the submission request has been accepted. The user can cancel the submission request after it has been accepted.

When the data is submitted, the file name with the appended label and file itself are provided to the Data Element Identification Service 1612. This service isolates each data item in each segment that is to be processed by the VIEC service 1616. In a further embodiment there is an option to cancel or stop a transaction after it has been submitted. The Data Element Identification Service 1612 processes the total transaction before forwarding it to the VIEC Service 1616. All the data elements isolated are identified with the customer, process, object, segment and field identification that was established during customer registration.

The VIEC Service 1616 executes for each data element in the transaction; the VIEC functions that were selected for that data element during customer registration. The condition code(s) that are returned by each VIEC Function ID for each data element are stored. These condition codes are considered part of the results of the inspection process. The VIEC service 1616 uses information in the submission label to automatically customize the VIEC service 1616 for this transaction.

The VIEC Service 1616 is considered to be the engine of the data validation and monitoring Service. After the VIEC Service 1616 has completed the entire transaction, the reporting service 1626 is then invoked.

The reporting service 1626 uses the predetermined selections made in customer registration and the customization selected at submission time that are contained in the submission label created by the label service 1608. Each document/file submitted is treated individually for reporting purposes.

The Condition Code Service 1620 is used to associate with each condition code that returned the information that the customer wanted to appear in the log file. Thus the results are tailored for each customer. Each document/file is graded and rated according to the rules established in customer registration by the grading service 1618. The color grade is determined (ex.—green=acceptable) and the rating (from 1 to 5) is determined. Both of these are put in the data validation and monitoring label, which is appended to the file name, & label submitted and to the log file created by the Logger Service 1628.

The Logger Service 1628 automatically and unconditionally creates a log file that contains for each isolated data element the condition code returned, the results of the condition code service 1620, and the results of the grading service 1618. This information is used by the recipient to perform the applicable root cause analysis for each condition code returned from the VIEC Service 1616.

If the customer had selected the Office Automation (Auto) Service 1634 then the results are also converted to the selected form (ex.—spreadsheet). If the customer had selected the Portable Document Service 1630 then the log file and/or the Office Automation output is converted also to the selected format (ex.—Adobe PDF)

The Delivery Service 1636, based upon the selection made at customer registration and/or in the submission label, delivers the output of the Reporting Service 1626 to the intended destinations. The type of delivery and the methods used would include FTP, email, directory entry, etc.

The Notification Service 1632 enables the customer to be notified of the existence of certain conditions (ex.—a production file with a color code of red), which are detected by the data validation and monitoring service. The notification methods include email, paging, and other messaging services or other notification methods (ex.—flashing red light).

The Label Service 1624 creates the labels and the contents that will have been selected by the customer for the results of the VIEC process (ex. Label appended to filename and use standard contents).

The data validation and monitoring server can be configured to be a dedicated or shared server. For a dedicated server, the message/file names are all unique for a sender (multiple sites); the server is dedicated to one sender. For shared configurations, multiple senders are sharing the server and each sender is uniquely identified and each sender can use any message/file name that has been pre-determined for the sender. (Thus multiple senders can have the same message/file name.

The VIEC policies/rules/methods are pre-determined for each sender and file name combination and are considered static.

The M/FIN format and contents can vary for each sender and are pre-determined. The M/FIN are optional or mandatory on a sender basis. The M/FIN is not forwarded to the receiver but can be recorded in the data validation and monitoring log file on an optional basis.

The data validation and monitoring log file can be transmitted to sender and/or receiver. The default condition is pre-determined, but can be changed dynamically using the M/FIN. The sender's message file is forwarded to the receiver by default but can be changed dynamically using the M/FIN.

Under certain pre-defined conditions in the VIEC process, the message file may not be forwarded to the receiver. (Ex.—field value outside limits) Under this condition, the data validation and monitoring log file will now not be forwarded to the receiver.

The data validation and monitoring server 204 intercepts the message file and performs the selected VIEC process on it. Typically it would forward the message file and the data validation and monitoring log file to the receiver 210. The receiver 210 would make a decision on what to do with the message file based upon the contents of the data validation and monitoring log file/message.

The sender 202 and the receiver 210 both have to implement logic, etc. to Validate/Inspect/Examine/Check the structure and contents of a message or file. The sender's motive is to insure the quality of the message file and its contents before transmitting to the receiver(s). This has a quality control and allowable content and perspectives.

The receiver's motive is to verify the message file is what is expected before attempting to process it. Typically the burden falls on the receiver to handle all the "What If" conditions that can be encountered in processing the message file.

The data validation and monitoring server 204 relieves both the sender 202 and receiver 210 of providing for this type of processing. The administration of the VIEC policies/rules for both the sender and receiver is typically a problem for both. If changes are made, the change has to be communicated and implemented by both simultaneously. With data validation and monitoring, certain changes become transparent to both the sender and receiver. The data validation and monitoring server gives the sender the option to return to the sender and not forward to the receiver any message file that meet certain conditions. In addition, a test mode can be used that returns the message file, M/FIN, and log to the sender only. There is also a need to have thin clients in web applications. The data validation and monitoring server removes from the client all the code for validating/inspecting/examining/checking what is sent or received.

It also centralized it, reducing the total code, simplifying the VIEC administration.

Summary of Events

Figure 18A:
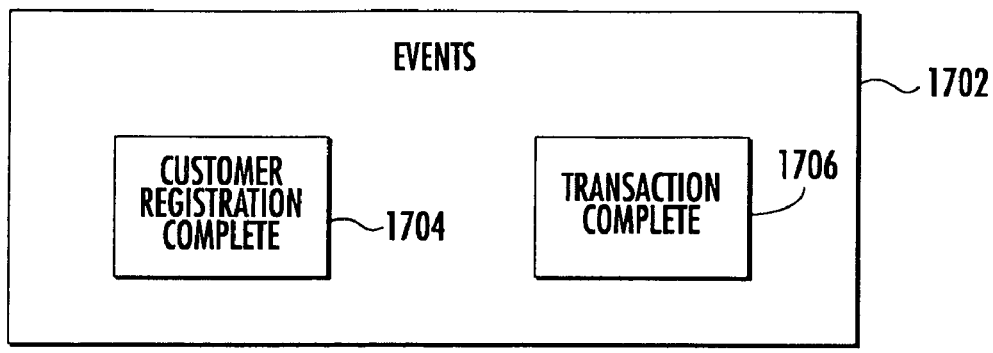
FIG. 18a, b and c are a summary of the events.
Figure 18B:
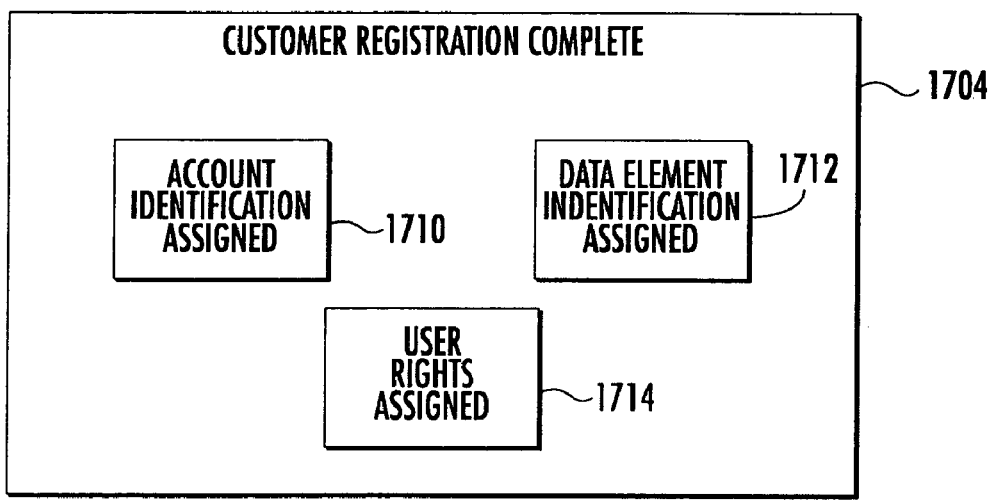
Figure 18C:
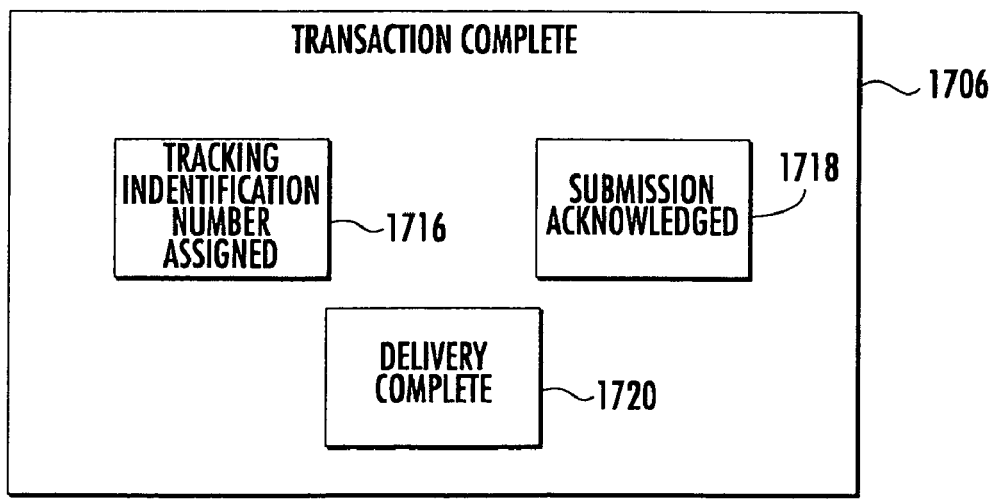

Referring now to FIGS. 18a, b and c, which is a summary of the events 1702, there can be seen that the two main events that occur in data validation and monitoring are customer registration is complete 1704 and transactional (processing) is complete 1706. The key events for customer registration 1704 are when the account identification has been assigned 1710. This is used for security, submission, accounting, and billing. The data element identification 1712 complete indicates that all data elements for a potential submission have been registered or verified. The user rights assigned 1714 indicates that authorized users have been completely registered and rights are validated. The transaction complete 1706 events refer to the processing of the submission. The first event is the tracking identification number 1716 has been assigned the next is the submission (of the data) has been acknowledged 1718 by the server to the sending computer. The delivery complete 1720 indicates that all the processes reporting etc. required for this submission is completed.

Message/File Identification Number (M/FIN) also known as a Label

The objective of this function is to also give the sender dynamic control over selected functionalities of the data validation and monitoring server on a file-by-site basis. The Message/File Identification Number ("M/FIN") contains the following type of data:
1) Operating mode (ex.—test or production)
2) VIEC functionality selection (ex.—more or less)
3) Transmission control (ex.—send output user file, data validation and monitoring log file and file identification number only to sender)
4) Override server functionality (ex.—bypass VIEC)
5) Commentary information (ex.—this is a test)
6) Reference information (ex.—test case number)
7) VIEC version number (ex.—V 3.1)

Data Validation and Monitoring Log File

The primary objective of this file is to give the receiver information resulting from the VIEC process so that a decision can be made as to what type of processing to do with the message file. Assign a grade of green (ex.—meets all test VIEC requirements); yellow (ex.—warning about contents or structure of file); red (ex.—recommend not to use file for production); and black (authorization required to process), etc.

In addition for each VIEC exception, a condition code (ex.—C137) and other information (ex.—value in field not in reference table) will be assigned.

The secondary purpose is to assist the sender in assessing the quality and validating the information being sent to the receiver. This is important during testing of new applications, testing changes to existing applications, and that affect the data the sender sends to the receiver. This will save time and effort in debugging and testing.

The Delivery Service can use push or pull methods based upon customer selection.

Data Wall

Figure 19:
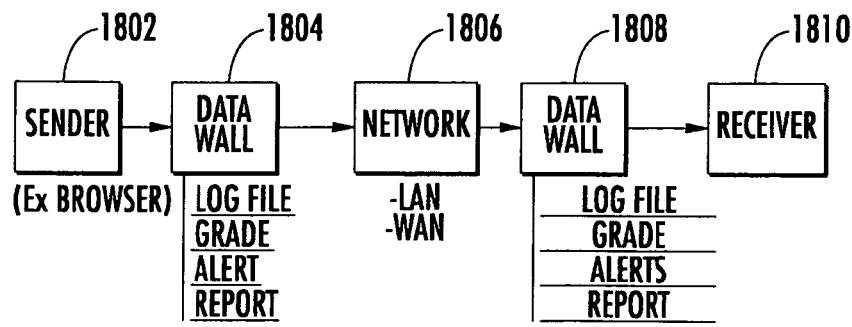
FIG. 19 is a high-level block diagram of the data wall embodiment.

Referring to FIG. 19 there is shown a high-level block diagram of the data wall embodiment. The data walls 1804 and 1808 are used to: prevent unacceptable data from passing through (this reduces "garbage in"); to record/log the unacceptable data and events; and, to generate notices/alerts about the events. A user 1802 is connected to a first data wall 1804, which is connected to a network 1806, which connected to a second data wall 1808 to which a receiver 1810 is connected. Firewalls control access primarily based upon address/routing information. The data wall does not use address/routing information but relies on application data. The data wall could be considered a node/hop in the path of the data. An active element in the transportation path of the data. The version of the specifications to be used is selectable. A data wall is a combination of a hardware-software system that prevents data that does not satisfy specific conditions from passing through. The data wall prevents the data transfer when certain conditions are detected.

Data Bugs

A data bug is an error that manifests itself in the data produced by a program. The data bug can be caused by a software bug, a data entry error by a user, or introduced by any system or method that handles/transmits the data. All data bugs cannot be corrected by the process known as debugging.

Data bugs can be obvious or hidden in the data, and they can be caused by major and minor bugs and other causes. Data bugs can be caused by software or hardware components.

Process Inspector

Figure 20:
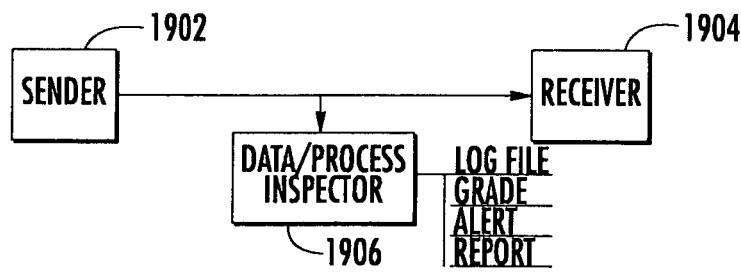
FIG. 20 is a high-level block diagram of the process inspector embodiment.

Referring to FIG. 20 there is shown a high-level block diagram of the process inspector embodiment. The objective of the process inspector 1906 is to inspect the data that is being transmitted from a data source (sender) 1902 to another destination (receiver) 1904. The process inspector is not a node in the path of the data. It is a passive element. All the functions of data validation and monitoring are available. The difference being it is not involved in the transportation of the data.

Common Inspection Facility

Figure 21:
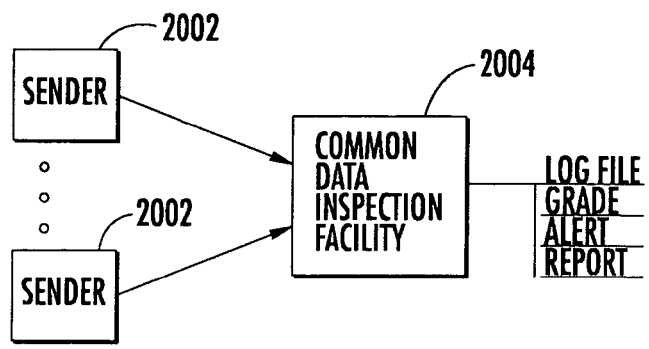
FIG. 21 is a high-level block diagram of the common inspection facility embodiment.

Referring to FIG. 21 there is shown a high-level block diagram of the common inspection facility embodiment. The function is to be used by members (senders) 2002 of a data exchange community to have their data inspected by an independent, common facility 2004. This would assist them in determining their respective readiness to exchange data that satisfies the specifications that they are expected to satisfy. Members can simultaneously submit their data and analyze the results accordingly. All functions of data validation and monitoring are available to each registered customer.

Software Unit Inspector

Figure 22:
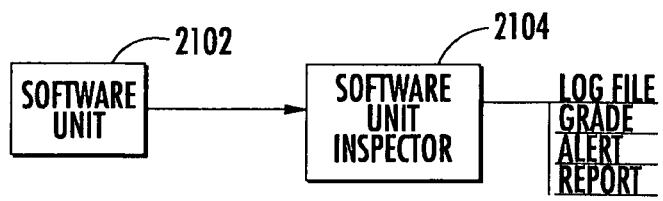
FIG. 22 is a high-level block diagram of the software unit inspector embodiment.

Referring to FIG. 22 there is shown a high-level block diagram of the software unit inspector embodiment. The purpose of this function is to inspect data that is output by a software unit 2102. The software would be any software function (module, routine, application, executable, DLL etc.) that outputs data. The data would typically be in a file form. The file could be stored in a directory. The software unit inspector 2104 can be co-located in the same computer as the software unit that creates the output. The submission can be interactive or non-interactive (API form). All the functions of the data validation and monitoring are available to each registered customer. The version of the specifications to be used is selectable.

Database Inspector

Figure 23:
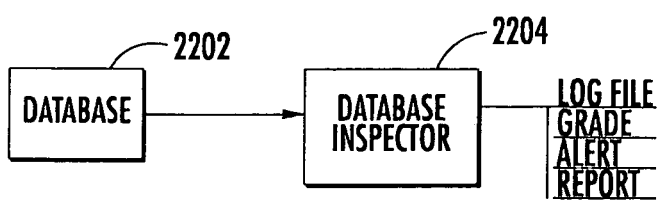
FIG. 23 a high-level block diagram of the data base inspector embodiment.

Referring to FIG. 23 there is shown a high-level block diagram of the database inspector embodiment. The purpose of the database inspector 2204 is to inspect data that is stored in any type of database 2202 (ex. relational). Software outside this invention would convert/export the desired data to a file format. The file would then be submitted to data validation and monitoring. All the functionality of data validation and monitoring would be available to registered users. The version of the specifications to be used is selectable.

Data inspection is the process of examining a data object to determine if it satisfies predetermined conditions. The data object contains data elements that can be identified, isolated, and extracted. The data elements can be of any type that a computer can generate. The extracted elements are then subjected to a predetermined series of examinations. The results for each examination, for example, could be pass, fail, indeterminate. The results are recorded for subsequent analysis. The scope of the examination includes testing the value of the data element against predetermined acceptable values, checking for the presence of unacceptable characters, verifying the format of the data.

Data Collection Inspector

For data that is collected using a stand alone device, such as a Personal Digital Assistant (PDA), data entry device, Personal Computer (PC) etc., the data collection inspector could analyze this data before it is entered into the system. It could also be used to support training where the data entered is evaluated using data validation and monitoring.

Data Field Notifier

Data field level information is contained in the data validation and monitoring log file. Thus each field can be graded and rated individually. Thus when the information is displayed or printed, etc. the user can be notified as to the integrity and quality of the individual data element.

Data Analysis

Using the results of the inspection and following predetermined rules, a grade and rating is assigned to the data object. Examples of grades are red, green, amber, black, and an example of a rating is the range from one to five. One purpose of the data analysis is to convey to the recipient of the data object an indication of its quality. Based upon this information, the recipient can make a decision on how to handle this data object. One part of the data analysis is to provide specific information about the examinations and the results thereof. An example of the use of this information would be to perform a root cause analysis. Another part of the data analysis is to identify patterns and trends, regulating the quality of data objects over a period of time.

Data Signaling

Signals are used to communicate information about the data object from a source to a destination. An out-of-band type communication signaling is used because it is not contained within the data object. The signaling is contained in a data validation and monitoring certification object (DCO) that is appended to the data object name. The DCO contains information that is usable by the recipient of the data object without having to "open" the data object. A data object can have multiple DCO's appended to the name depending upon how data validation and monitoring was used. The final recipient would have all the DCO's; the DCO's are a result of data validation and monitoring processing the data object. Examples of what the DCO would contain are the tracking number assigned by data validation and monitoring, the color grade, the rating, the size of the data object, the date and time the DCO was created, a unique identifier for the data validation and monitoring node.

Data Monitoring

Data monitoring is the process of performing inspections on a selective sample basis. For some stages of a project, every data object may be inspected. For a production mode, every $n^{th}$ file may be inspected. Also, only data objects with a specified information in the name are selected for inspection. The criteria, for example, could be related to a time period of the data, or be adoptive to the volume of data objects submitted within a period. A data validation and monitoring monitory object (DMO) would also control the data monitoring. If a DMO was received with the submitted rule, it could indicate the type of inspection to be performed that would overrule all other requirements. The DMO also contains other information that is used by the data validation and monitoring process. The DMO contains the date and time the DMO was created, the inspection options selected, the data monitory options selected, the grading options selected, etc. The DMO remains as a permanent part of the data object name.

Labeling (Electronic)

Create the equivalent of a label for a file that contains information associated with the file that can be used with out opening the file itself. Similar to how a physical package has a label on the outside the information on it is useable without opening the package.

The log created by the system can be viewed as a detailed packing slip and inspection report.

File Name

The file name is equivalent to a label and packing slip on the outside of a physical package being shipped. A person does not need to open the package to determine the disposition of it (the contents are sealed). The label part is used for routing. It contains from, to, type of delivery service, etc. Info that is needed by the transporting company The packing slip part (which fits in a pocket on the outside) gives information about the contents of the package. This is primarily used by the recipient to determine the internal destination of the package to open it.

The label also contains an electronic & human readable tracking identification number for the individual package. The label may also indicate if this package is one of many in a shipment. It can also be like a way bill that goes into a pouch outside the package The paradigm shift here is to have the file name contain information that the recipient can use to make decisions about the receiving process that will be used for this package (like a selection on a phone system). Some packages have devices, etc on them that indicate if the package has been subjected/exposed to certain conditions during shipment (ex.—shock, indicators).

For physical packages the shipping containers can be used to visually check the package for signs of mishandling, etc. (ex.—crushed corners, water spots—anything that could be harmful to the contents.)

Another part of the paradigm shift is to allow and enable the processes (such as data validation and monitoring) update the info in the name, which will be useful to the recipient. If data validation and monitoring is performed before the name is generated then the name would not need to be updated.

The data validation and monitoring info could be also like a sticker that is added to the package (like security check at the airport).

In an OSI model type processing each layer of the stack can add a header to the front of the others, which is stripped off the by corresponding layer of the other stack. Adding a dot to the file name is one way of adding a label to the package as is used with a file extension.

Field Level Grading

Data validation and monitoring can grade and rate each field that it inspects. This field level grading will be helpful as an example when data elements from another database are used in an application and the user of this data needed to know something about the integrity of each data element. Thus, for example, when the data is displayed, an indicator could show for each field the grade and rating of it. For example, a red circle would indicate to the viewer that this data element failed the inspection. The field level reading information would be recorded in the data validation and monitoring log file if this option was selected. (The file level grading for the associated file would also be contained in the log file, along with all the input and output labels.)

Data Validation and Monitoring Label Viewer

To view the contents of the label, a view and launch functionalist would be provided (analogous to what is used for PDF file types). The viewer would be downloadable from a data validation and monitoring server. The viewer would decode the label (input, output, etc.) and display them in a human readable format. A similar viewer would be used for the data validation and monitoring log file.

Control of a Remote Process

Use a label appended to the file name (preferred embodiment) to communicate information associated with the file to whoever uses the file. The label is the transport method to communicate this information. This label is available to all users of the file. The label is the preferred embodiment, for sensitive information would be encrypted thereby giving confidentially and limited access to the information. The label could be in text character form or encoded. Therefore the method allows for protecting of information contained in the label, which is considered a part of the file name (object) in another embodiment the label would be unencrypted.

External Functions

The present invention can use other systems to validate field contents. These systems/databases can be local or wide area, but can be real-time (or could be batch) (ex. VIN validation with black book).

Use standard process methods such as a CD Rom subscription type service to insure performance & reliability where practical for static type info (ex. zip codes, VIN's, etc) or can use on-line services primarily for dynamic data.

Data can be viewed as a package being transferred between and delivered to various systems and networks. Systems and networks may have sent the original data out for processing remotely and wish to verify the integrity before opening to insure that the data has not been tampered with. A system may not need to know what the data content is or it may not be desirable to allow access to encrypted information, thus the data if verified as not having been to tampered with may then be passed on, partially processed, or fully processed by any given module or system.

An Illustrative Exemplary Application Employing the Present Invention.

The exemplary application, data validation and monitoring v 1.0 database, utilizes one embodiment of the present invention, wherein the exemplary application accesses user files, one by one, and runs them against a series of predetermined conditions. Flags are set up to indicate the status of each individual file. A green flag indicates a valid file, while a red one shows the need to return to user for additional information or corrections. A yellow flag status shows a minor problem such as the wrong state selection, which can easily be corrected by so coding the database (available in a future version.)

Examples of Flag Instances:

data validation and monitoring v 1.0 is set up to check for the following 4 conditions:
1. Incomplete forms. Let's take for example, user "Jane Miller". Her user file is missing the entry for "city." This is a required field, and thus a red flag is generated.
2. State code is invalid. In the case of user "Matthew Jones" who entered NX for his state, instead of NJ, a yellow flag is generated. This spelling error is not as critical as not filling out the field all together.

3. Amount of money remitted is not valid for the number of years the license was requested. This condition is set up so that the exact number of dollars must be remitted. (This application is set for $12/yr, but can easily be changed.)
4. Invalid age. User must be at least 17 years of age. In later versions, age limit will vary according to state legislation. (i.e. Calif. minimum driving age is 16) Finally, Brian Flynn, a user with a complete and correct file, received a green flag.

A Quick Tutorial

Figure 24:
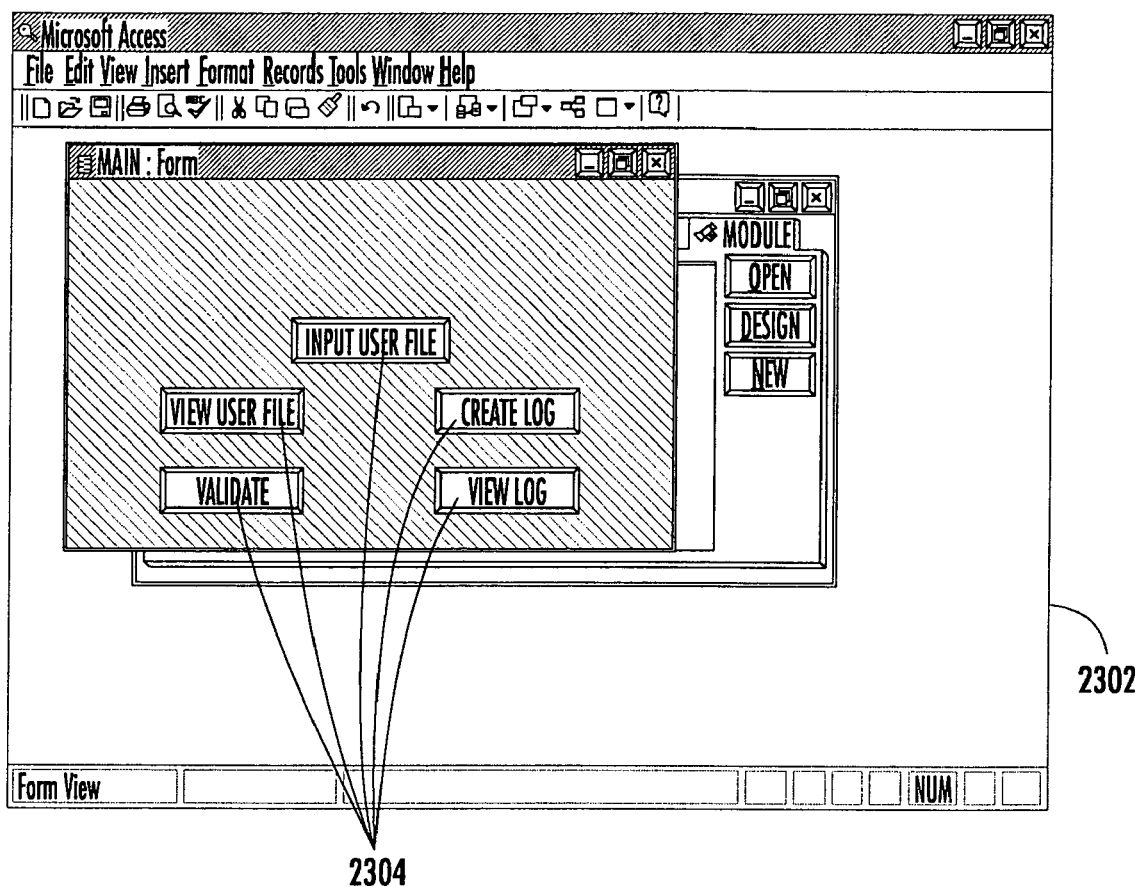
FIGS. 24, 25 and 26 are exemplary user screen displays.

Referring to FIG. 24 there can be seen an exemplary screen 2302 where there are five options 2304 available on the main menu. Input User File, View User File, Validate, Create Log, and View Log.

To enter a new user, click button "Input User File." The following text is displayed:

There are no restrictions put on this page. Any input will be accepted. After the form is submitted, a unique identification number is assigned to each particular application. This is the number used from now on to refer, validate, or view a user file.

The user file can be seen in Read-only format by clicking on the next button, "View User File." A screen asking for the Application Sequence Number pops up. In the future, this number will be selected from a drop down list. For now, it can only be obtained from the Applications table. For the sake of this exercise, we will give you the Applications Sequence Numbers for our example users. (Jane Miller ASN: 8, Matthew Jones ASN: 9, Tom Newman ASN: 10, Rachel Green ASN: 11, and Brian Flynn ASN: 13)

Figure 25:
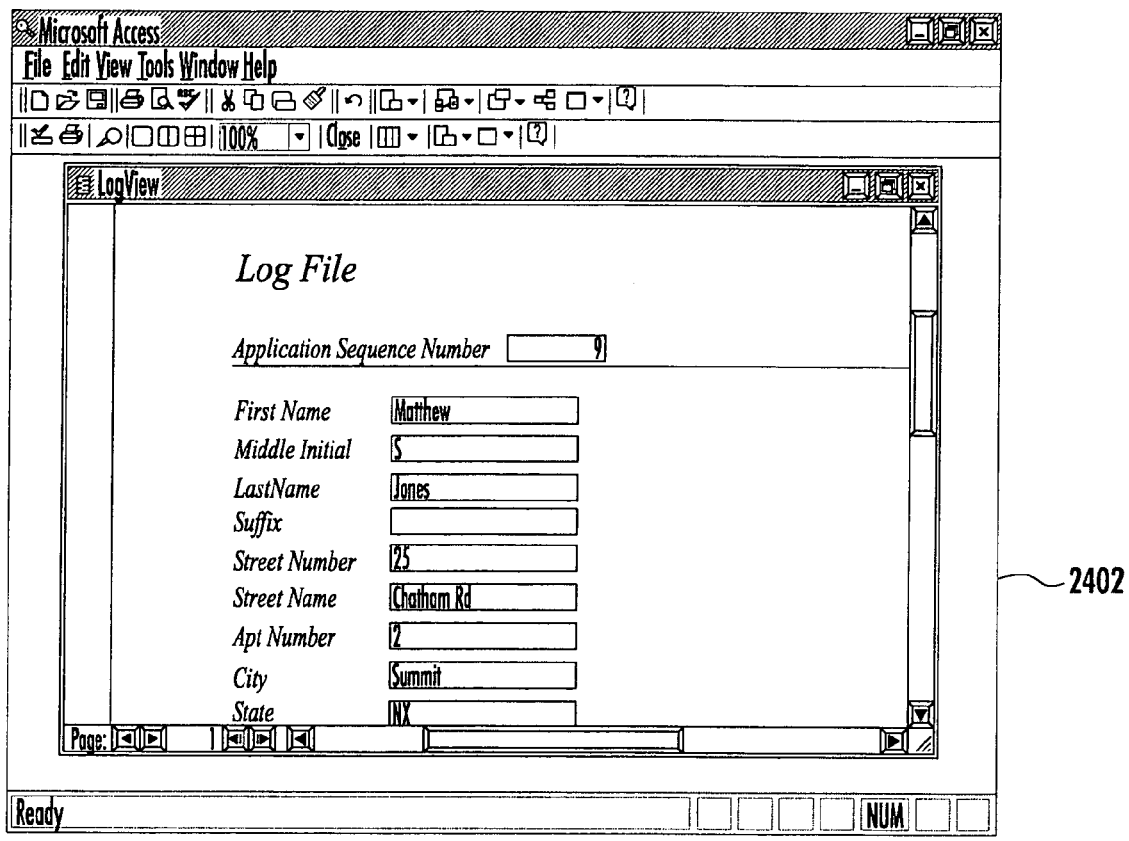

The "Validate" button on the Main Menu, submits the file to the series of tests described in the introduction. Flags are assigned in this step matching the status of the user file. The "Create Log" button prepares all information on the user file, including the flag, to be viewed. This can be done by clicking the "View Log" button, which will display the exemplary screen shown 2402 in FIG. 25.

Figure 26:
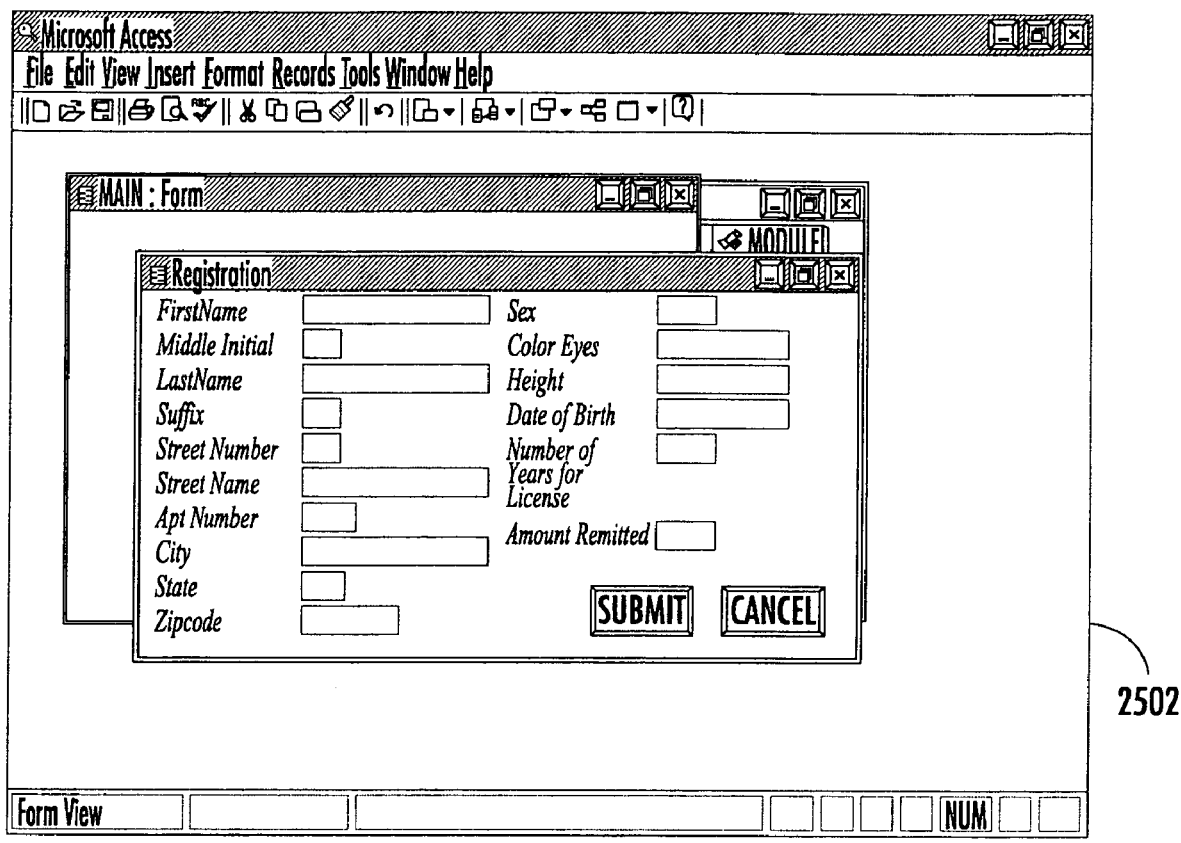

Referring to FIG. 26, an exemplary screen display 2502, there is shown a user screen representative of a user interface for entry of corresponding data.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

What is claimed:

1. A business method for determining and signaling content quality of preexisting independently created digital data independent of a user, the preexisting independently created digital data is provided between digital devices including a digital source and a digital receiver of the preexisting digital data content, the preexisting independently created digital data having a plurality of data records, each of the plurality of data records having a plurality of data fields, the business method comprising the following steps:

accessing remotely the preexisting independently created digital data;

assessing the quality of the content of the preexisting independently created digital data using one or more predefined sets of criteria without user interaction;

assigning a grade indicative of the quality of the content of the preexisting independently created digital data as a function of the one or more predefined sets of criteria without user interaction; and, marking the preexisting independently created digital data with the assigned grade without changing and without accessing the content of the preexisting independently created digital data and without user interaction; wherein the digital receiver without user interaction dynamically evaluates the marked grade to determine suitability for subsequent use of the preexisting independently created digital data without accessing the preexisting independently created digital data;

whereby another digital receiver without user interaction can independently determine suitability from the marked grade for another subsequent use of the preexisting digital data without accessing the preexisting digital data.

2. The business method as recited in claim 1 wherein the step of linking further comprises associating a portion of a file name to the grade.

3. The business method as recited in claim 2 wherein the filename corresponds to a file containing the preexisting independently created digital data.

4. The business method as recited in claim 1 further comprising associating a grade file with the grade.

5. The business method as recited in claim 1 wherein the quality corresponds to a particular data field of the plurality of data fields.

6. The business method as recited in claim 1 wherein the quality corresponds to a particular record of the plurality of data records.

7. The business method as recited in claim 1 wherein a particular quality corresponds to a particular record of the plurality of data records.

8. The business method as recited in claim 1 wherein a particular quality corresponds to a particular field of the plurality of data fields.

9. The business method as recited in claim 1 wherein the criteria for determining the quality is a predefined function.

10. The business method as recited in claim 1 wherein the criteria for determining the quality uses access to a database.

11. The business method as recited in claim 1 wherein the criteria for determining the quality is an externally defined function.

12. The business method as recited in claim 1 wherein the criteria for determining the quality uses access to an independent database.

13. The business method as recited in claim 1 wherein the grade is numeric.

14. The business method as recited in claim 1 wherein the grade is a color.

15. The business method as recited in claim 1 wherein the grade is a Boolean.

16. The business method as recited in claim 1 wherein the business is sales.

17. The business method as recited in claim 1 wherein the grade corresponds to merchandise quality.

18. The business method as recited in claim 1 wherein the data corresponds to direct marketing data.

19. The business method as recited in claim 1 wherein the data corresponds to mailing addresses.

20. The business method as recited in claim 1 wherein the step of linking further comprises associating the grade to a data set.

21. The business method as recited in claim 1 wherein the criteria for determining the quality is customized by the business.

22. The business method as recited in claim 1 further comprising assigning a rating as a function of the grade.

23. The business method as recited in claim 1 wherein the data corresponds to documentation.

24. The business method as recited in claim 23 wherein the grade corresponds to the version of the documentation.

\* \* \* \* \*